United States Patent [19]

Ohno et al.

[11] Patent Number: 5,705,302
[45] Date of Patent: Jan. 6, 1998

[54] COLOR FILTER FOR LIQUID CRYSTAL DISPLAY DEVICE AND METHOD FOR PRODUCING THE COLOR FILTER

[75] Inventors: Yoshihiro Ohno; Hiroshi Kiguchi; Fumiaki Matsushima; Taeko Nakano; Kuniyasu Matsui; Tsuyoshi Sunagawa; Toshiki Nakajima; Satoru Miyashita; Shigeyuki Ogino, all of Suwa, Japan

[73] Assignee: Seiko Epson Corporation, Tokyo, Japan

[21] Appl. No.: 468,479

[22] Filed: Jun. 6, 1995

Related U.S. Application Data

[63] Continuation-in-part of Ser. No. 406,263, Mar. 17, 1995, Pat. No. 5,554,466, and Ser. No. 367,287, May 13, 1994, abandoned, which is a continuation-in-part of Ser. No. 183,204, Jan. 18, 1994, Pat. No. 5,399,450, said Ser. No. 406,263, is a continuation of Ser. No. 183,204, Jan. 18, 1994, Pat. No. 5,399,450, which is a continuation of Ser. No. 552,274, Jul. 12, 1990, abandoned, which is a continuation-in-part of Ser. No. 344,636, Apr. 28, 1989, abandoned.

[30] Foreign Application Priority Data

| Jul. 12, 1989 | [JP] | Japan | 1-179504 |
| Jul. 27, 1989 | [JP] | Japan | 1-194497 |
| Nov. 8, 1989 | [JP] | Japan | 1-290519 |
| Mar. 20, 1990 | [JP] | Japan | 2-70308 |
| Apr. 12, 1990 | [JP] | Japan | 2-96913 |
| Apr. 16, 1990 | [JP] | Japan | 2-99528 |
| Apr. 16, 1990 | [JP] | Japan | 2-99529 |
| Apr. 17, 1990 | [JP] | Japan | 2-101110 |
| May 13, 1993 | [JP] | Japan | 5-111853 |
| Jul. 26, 1993 | [JP] | Japan | 5-184135 |
| Jul. 26, 1993 | [JP] | Japan | 5-184136 |
| Aug. 12, 1993 | [JP] | Japan | 5-200864 |
| May 13, 1994 | [WO] | WIPO | PCT/JP94/00780 |

[51] Int. Cl.[6] .................. G02B 5/20; G02F 1/1335
[52] U.S. Cl. .................. 430/7; 349/106; 205/109; 205/122; 427/164
[58] Field of Search .................. 430/7; 205/109, 205/122; 427/162, 164; 349/106

[56] References Cited

U.S. PATENT DOCUMENTS

| 4,639,088 | 1/1987 | Suginoya et al. | 350/339 F |
| 4,670,188 | 6/1987 | Isawa et al. | 252/513 |
| 5,399,450 | 3/1995 | Matsushima et al. | 430/7 |

FOREIGN PATENT DOCUMENTS

| 62-153937 | 7/1987 | Japan . |
| 63-165822 | 7/1988 | Japan . |
| 2-270993 | 11/1990 | Japan . |
| 2-267298 | 11/1990 | Japan . |
| 4-156401 | 5/1992 | Japan . |
| 6-34809 | 2/1994 | Japan . |

*Primary Examiner*—John A. McPherson
*Attorney, Agent, or Firm*—Stroock & Stroock & Lavan LLP

[57] ABSTRACT

A color filter for a liquid crystal display device comprises an optically transparent substrate, a transparent conductive layer formed on the substrate, and a color layer formed on the transparent conductive layer with red, green and blue pixels arranged in a predetermined pattern. The color layer comprises pigments for coloring purpose and transparent conductive particles having a hydrophobic surface. The transparent conductive particles are included from 5% to 50% by volume of the color layer. The color layer may preferably have a specific resistivity of from $10^{-1}$ Ω·cm to $10^8$ Ω·cm. The transparent conductive particles comprise base transparent conductive particles having a hydrophobic compound bound on their surface by coupling or graft polymerization. A typical process of the color filter production comprises the steps of: (a) forming the transparent conductive layer of a predetermined pattern on the transparent substrate, (b) preparing a micelle colloid dispersion by dispersing a pigment and transparent conductive particles having hydrophobic surface in a medium containing a redox reactive surfactant and an electrolyte, and (c) carrying out an electrolysis in the micelle colloid dispersion by utilizing the transparent conductive layer on the transparent substrate for the anode to deposit the color layer comprising the pigment and the transparent conductive particles on the transparent conductive layer.

22 Claims, 7 Drawing Sheets

COLOR FILTER FOR LIQUID CRYSTAL DISPLAY DEVICE AND METHOD FOR PRODUCING THE COLOR FILTER

CROSS-REFERENCE TO RELATED APPLICATIONS

This Application is a Continuation-in-Part of application Ser. No. 08/406,263 filed Mar. 17, 1995 now U.S. Pat. No. 5,554,466, which is a Continuation of Ser. No. 08/183,204, filed Jan. 18, 1994, now U.S. Pat. No. 5,399,450, which is a continuation of Ser. No. 07/552,274, filed Jul. 12, 1990 (abandoned) which is a Continuation-in-Part of Ser. No. 07/344,636, filed Apr. 28, 1989 (abandoned). This Application is also a Continuation-in-Part of application Ser. No. 08/367,287, filed May 13, 1994, now abandoned, which is a Continuation-in-Part of Ser. No. 08/183,204, filed Jan. 18, 1994, now U.S. Pat. No. 5,399,450.

BACKGROUND OF THE INVENTION

1. Technical Field

This invention relates to a color filter adapted for use in a liquid crystal display device and a method for producing such a color filter.

2. Background of Art

A typical color filter used in a liquid crystal display device is shown in FIG. 2. A color filter 200 shown in FIG. 2 is adapted for use in a STN type liquid crystal display device or in an active matrix drive liquid crystal display device utilizing MIM element. In the color filter 200, a color layer 204 is formed on a transparent substrate 202, and the color layer 204 comprises red (R), green (G) and blue (B) pixels arranged in a predetermined pattern, for example, mosaic, triangle, or stripe pattern. On the color layer 204 is formed a protective layer 208 comprising a transparent resin, and then, a transparent conductive layer 206 comprising ITO (Indium Tin Oxide). The transparent conductive layer 206 is formed in a pattern corresponding to the pixels constituting the color layer 204.

The color filter 200 of such constitution is hereinafter referred to as IOC (ITO on color filter) type since the transparent conductive layer 206 is directly or indirectly formed on the color layer 204.

In the color filters of IOC type, the transparent conductive layer 206 comprising an inorganic material is disposed on the color layer 204 mainly comprising organic materials with the intervening protective layer 208, and as a consequence of such structure, the color filter of this type suffer from the problems as be described below.

First, the method for depositing the transparent conductive layer 206 is limited to sputtering or vapor deposition at a low temperature since the transparent conductive layer 206 must be deposited on the protective layer 208 with limited heat resistance. The transparent conductive layer formed at such a low temperature, however, suffer from an increased value of resistance. In the case of a large-size display, such an increase in the resistance of the transparent conductive layer may result in a voltage drop at the wiring, and hence, in an inconsistent driving voltage, and the display may then exhibit an inconsistent contrast or brightness.

Second, since the transparent conductive layer 206 comprising an inorganic material is formed on the protective layer 208 comprising an organic high polymer, the transparent conductive layer is quite likely to fall into electrically disconnected conditions due to the difference in the thermal coefficient of linear expansion to detract from long-term reliability.

Third, the formation of the protective layer 208 on the color layer 204 for the purpose of enabling the patterning of the transparent conductive layer 206 results in an increased number of production steps in the production of the color filter, which in turn results in an increased production cost and reduced yield.

In order to solve the problems as described above associated with the color filter of IOC type, color filters of COI (color filter on ITO) type wherein the color filter is formed on the transparent conductive layer have been developed. However, such color filters of COI type suffer from another problem since the color layer acts as an insulation film. When a voltage is applied between electrodes of the liquid crystal display device, the voltage applied is shared between the color layer and the liquid crystal layer. Since the color layer of the color filter has a substantial capacitance that can not be neglected in relation to the capacitance of the liquid crystal layer, the effective voltage to be applied to the liquid crystal layer would be insufficient due to the voltage drop at the color layer. Consequently, the liquid crystal display device would exhibit a poor contrast, and the voltage-transmittance curve would show an increase of threshold voltage or a steep change of the transmittance curve.

One attempt for solving such a problem associated with the color filter of COI type is reduction in thickness of the color filter. For example, Japanese Patent Application Laid-Open No. 2-2672985 proposes a technique of forming a color layer comprising solely pigment and free from resin utilizing the micelle electrolysis.

However, the prior art has not provided a fully satisfactory color filter and method of production.

SUMMARY OF THE INVENTION

Generally speaking, in accordance with the invention, a color filter for a liquid crystal display device is provided. The color filter can include an optically transparent substrate, a transparent conductive layer formed on the substrate, and a color layer formed on the transparent conductive layer with red, green and blue pixels, for example, arranged in a predetermined pattern. The color layer can comprise pigments for coloring purpose and transparent conductive particles having a hydrophobic surface. The transparent conductive particles can be included from 5% to 50% by volume of the color layer. The color layer may preferably have a specific resistivity of from $10^{-1}$ $\Omega$·cm to $10^8$ $\Omega$·cm. The transparent conductive particles can comprise base transparent conductive particles having a hydrophobic compound bound on their surface by coupling or graft polymerization.

A typical process of the color filter production can comprise the steps of:

(a) forming the transparent conductive layer of a predetermined pattern on the transparent substrate, (b) preparing a micelle colloid dispersion by dispersing a pigment and transparent conductive particles having hydrophobic surface in a medium containing a redox reactive surfactant and an electrolyte, and (c) carrying out an electrolysis in the micelle colloid dispersion by utilizing the transparent conductive layer on the transparent substrate for the anode to deposit the color layer comprising the pigment and the transparent conductive particles on the transparent conductive layer.

Accordingly, an object of the present invention is to provide an improved color filter of COI type wherein a voltage drop of the color layer is restrained so that the liquid crystal layer can be supplied with an effective voltage sufficient for developing a high contrast.

Another object of the present invention is to provide an improved process for producing such color filter.

Still other objects and advantages of the invention will in part be obvious and will in part be apparent from the specification and drawings.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
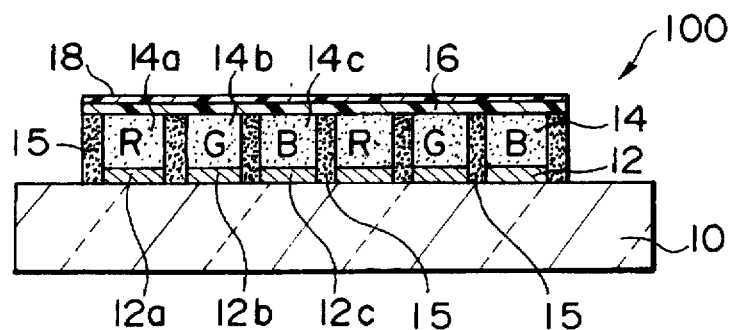
FIG. 1 is a schematic cross sectional view of the color filter manufactured in Example 1 of the present invention.
Figure 2:
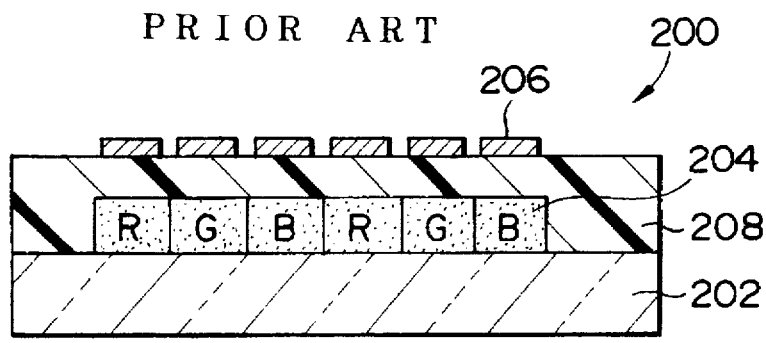
FIG. 2 is a schematic cross sectional view of a color filter of IOC type wherein the electrodes are formed at the outermost layer.

A color filter for liquid crystal display device of the present invention comprises an optically transparent substrate, a transparent conductive layer formed on the substrate, and a color layer formed on the transparent conductive layer with red, green and blue pixels arranged in a predetermined pattern. The color layer at least comprises pigments for coloring purpose and transparent conductive particles having a hydrophobic surface, and the transparent conductive particles are included from 5% to 50% by volume of said color layer. Color filters and methods of production are discussed in U.S. Pat. No. 5,399,450, the contents of which are incorporated herein by reference.

Since the color layer contains a predetermined content of the transparent conductive particles in addition to the organic pigments having an electric resistance comparable or close to an insulation, the resulting color layer is provided with a certain degree of electric conductivity to exhibit a reduced voltage drop upon application of the voltage. Accordingly, the problem of capacity division induced by the color layer associated with the color filter of COI type is considerably relieved, and a sufficient effective voltage would be supplied to the liquid crystal layer. The resulting liquid crystal display device would then exhibit an improved contrast and favorable voltage-light transmittance characteristic.

The color layer of the color filter according to the present invention can contain the transparent conductive particles at a content of from 5% to 50% by volume, and preferably, from 10% to 50% by volume of said color layer, and as a result, the specific resistivity of the color layer is reduced to the range of from $10^{-1}$ Ω·cm to $10^8$ Ω·cm, and preferably, from $10^{-1}$ Ω·cm to $10^7$ Ω·cm. When the transparent conductive particles are included less than 5% by volume of the coloring layer, the resistance of the color layer is not sufficiently reduced. On the other hand, when the transparent conductive particles are included in excess of 50% by volume of the coloring layer, the ratio of the transparent conductive particles to the pigment becomes too large. As a result of this, the color layer would have an unfavorable color characteristic, and flatness of the color layer would be impaired to consequently result in a disturbed alignment of the liquid crystal.

When the specific resistivity of the color layer is less than $10^{-1}$ Ω·cm, the resistance of the color layer is sufficiently reduced, and the effective voltage applied to the liquid crystal layer is substantially the same as the case wherein the specific resistivity is $10^1$ Ω·cm. On the other hand, when the specific resistivity of the color layer exceeds $10^8$ Ω·cm, the capacitance shared by the color layer would be different for each color due to the difference in the dielectric constant of the pigments respectively constituting the red, green, and blue pixels. The pixels would then exhibit different threshold voltages, and when such difference in the threshold voltage becomes excessively large, operation at 1/240 duty ratio which would be required for personal computers and word processors may become difficult.

The content of the transparent conductive particles as used herein is the value determined by calculating the weight of the color layer from the difference in the weight of the substrate before and after the deposition of the color layer; dissolving the transparent conductive particles (ITO particles) in the deposited color layer with an etching solution (e.g. 20% hydrochloric acid at a temperature of 40° C.) and measuring the quantity of dissolved indium in the etching solution by atomic absorption spectroscopy; and converting the thus measured indium quantity to % by volume by using the specific gravity of the substances (transparent conductive particles, pigments, resin, or the like) constituting the color layer. For a more precise determination of the content of the transparent conductive particles in the color layer, it would be required, if the transparent conductive particles are ITO particles, to subtract the portion of the ITO costituting the transparent conductive layer, or to constitute the transparent conductive layer with the material which is different from the one used in the color layer, for example, tin oxide.

The term, specific resistivity of the color layer as used herein is the value determined as described below. First, a transparent conductive layer of ITO is formed on a glass substrate of 2 cm 3 cm, and on the transparent conductive layer, there are formed the color layer to be measured and then the flattening layer. The flattening layer is deposited to a thickness of 0.2 µm when the color layer is formed by micelle electrolysis, and 0.1 µm when the color layer is formed by coating a resin dispersion. A coating of silver paste (manufactured by Grace Japan) having an area of 5 mm in diameter is then formed on the flattening layer, and a lead is bonded to the silver paste coating using a silver paste. Next, an LCR meter is connected to the transparent conductive layer and the lead to thereby measure the resistivity value. The resistivity value of the ITO layer is subtracted from the resulting resistivity value to calculate the specific resistivity. Therefore, in a strict sense, the term, specific resistivity as used herein designates the specific resistivity of the color layer plus the flattening layer. In the measurement, the frequency dependency is also measured by applying 1 V sine wave of 100 Hz to 100 kHz. It is then found that the frequency dependency is generally negligible in the low resistivity range, and in the present invention, the measurement at a frequency of 1 kHz is adopted.

In the present invention, the transparent conductive particles are treated to render their surface hydrophobic for the purpose of improving the dispersibility of the transparent conductive particles with the pigment that constituting an organic material and resin. The color filter in which such transparent conductive particles having a hydrophobic surface are used for the color layer is uniform in quality and experiences little change in the characteristics. Most pigments including phthalocyanine compounds that are used for the blue and green pigments have a hydrophobic surface. On the contrary, the transparent conductive particles comprising a metal oxide such as an oxide of indium, tin, or zinc is generally hydrophilic since hydroxyl group is liable to be formed on the surface of such transparent conductive particles. Since the transparent conductive particles and the pigment are different in the surface characteristics, i.e. hydrophilic and hydrophobic, the particles, even when they are mixed, would not become uniformly dispersed in each other due to such phenomenon as secondary aggregation of the hydrophilic transparent conductive particles. The situation is the same for the combination of the resin and the transparent conductive particles.

In the present invention, by rendering the surface of the transparent conductive particles hydrophobic as described above, the transparent conductive particles are provided with a significantly improved affinity, and hence, dispersibility with the pigment or the resin.

The surface of the transparent conductive particles may be rendered hydrophobic by either of the following two processes.

The first process is introduction onto the surface of base transparent conductive particles comprising ITO, tin oxide or the like of at least one coupling agent selected from silane coupling agents, titanium coupling agents, aluminum coupling agents, zirconium coupling agents, and zircoaluminate agents.

Exemplary silane coupling agents are the compounds represented by formula (1):

wherein

X is an alkoxy group, an acyloxy group, amino group or chlorine, $R^1$ and $R^2$ are independently an alkyl group, an alkenyl group, cyclohexyl group or phenyl group which may optionally have a side chain or oxygen bridge, and (m+n) is from 0 to 4; and the compounds represented by formula (1'):

wherein

R is an alkyl group,

Y is an organic group containing vinyl group, glycidyl group, methacryl group, amino group, mercapto group, isocyanate group, or azide group, or an organic group having a halogen atom selected from chlorine and fluorine on its terminal, and n is 2 or 3.

The silane coupling agents may typically be vinyl triethoxysilane, vinyl tris(2-methoxyethoxy)silane, 3-methacryloxypropyltrimethoxysilane, 2-(3,4-epoxycyclohexyl)ethyltrimethoxysilane, N-2-(aminoethyl)3-aminopropyltrimethoxysilane, N-2-(aminoethyl)3-aminopropylmethyldimethoxysilane, 3-aminopropyltriethoxysilane, N-phenyl-3-aminopropyltrimethoxysilane, N-phenyl-3-aminopropyltriethoxysilane, 3-mercaptopropyltrimethoxysilane, 3-chloropropyltrimethoxysilane, trimethylsilylisocyanate silane, trimethylsilylazidosilane, trimethoxyvinylsilane, trimethylchlorosilane, dimethyldichlorosilane, dimethylchlorophenyl silane, or the like. The silane coupling agents that may be preferably used in the present invention are trimethoxyphenylsilane, trimethylchlorosilane, and 3-glycidoxypropyltrimethoxysilane.

Exemplary titanium coupling agents are the compounds represented by formula (2):

wherein

RO is a hydrolyzable alkoxy group; and

X is a long chain hydrophobic group containing carboxyl group, sulfonyl group or phosphate group.

The titanium coupling agents may typically be isopropyltris(dioctylpyrophosphate) titanate, isopropyltriisostearoyl titanate, bis(dioctylpyrophosphate)oxyacetate titanate, bis(dioctylpyrophosphate)ethylenetitanate, tetraoctyl(dioctylphosphite) titanate, tetraoctylbis(ditridecylphosphite) titanate, isopropyltris(n-dodecylphenylsulphonylate) titanate, or the like. The preferred among these are isopropyltris(dioctylpyrophosphate) titanate and isopropyltriisostearoyl titanate.

The aluminum coupling agent may typically be acetoalkoxyaluminumdiisopyropylate; and the zirconium coupling agent may typically be tetraethoxyzirconium. Exemplary zircoaluminate agents are the compounds represented by formula (3):

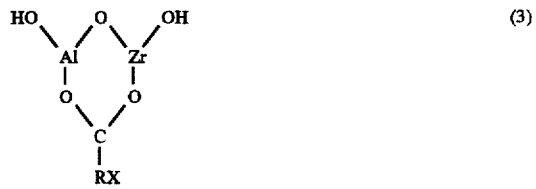

wherein

R is $(CH_2)_n$, n being an integer of from 1 to 8, and

X is —NH$_2$, —COOH, —H, —SH, or

—C(CH$_3$)=CH$_2$.

The second process is graft polymerization onto the transparent conductive particles of a monomer having a hydrophobic organic group on its end. Such monomer is not limited to particular species, and may typically be an acrylamide derivative, an alkyl (meth)acrylate compound, an aromatic vinyl compound, a halogen-containing vinyl compound, or a cyanated vinyl compound.

The acrylamide derivative may typically be N-isopropylacrylamide, and exemplary alkyl (meth)acrylate compounds are methyl acrylate, butyl acrylate, 2-hydroxyethyl acrylate, and glycidyl methacrylate. Exemplary aromatic vinyl compounds are styrene, α-methylstyrene, and vinyltoluene. Exemplary halogen-containing vinyl compounds are vinyl chloride and vinylidene chloride, and exemplary cyanated vinyl compounds are acrylonitrile and methacrylonitrile.

In the color filter of the present invention, the color layer may preferably have a thickness of from 0.4 μm to 2.0 μm, and more preferably, from 0.6 μm to 1.6 μm. The thickness of the color layer depends on the content of the transparent conductive particles in the color layer, and the thickness should increase with the increase in the content of the transparent conductive particles. When the thickness of the color layer is limited within the above-specified range, the color layer will exhibit sufficient color characteristic simultaneously with a fully improved conductivity. In the strict sense, since the pigments used in the color layer have their own dielectric constant, and the thickness of the color layer should be determined in consideration of the type of the pigments employed. For example, red pixel may preferably have a thickness of from 0.8 μm to 1.6 μm, green pixel may preferably have a thickness of from 0.7 μm to 1.3 μm, and blue pixel may preferably have a thickness of from 0.6 μm to 1.2 μm.

In the STN type liquid crystal display device, since flatness of the color filter surface is of crucial importance, the gap between the pixels should not exceed 0.2 μm. When the color filter of the STN type liquid crystal display device has a surface irregularity beyond such level, leak of the light at off-state voltage would increase to result in a poor contrast.

To overcome such inconvenience due to the difference in the thickness of the pixels, it is be preferable to form a transparent flattening layer on the color layer. The flattening layer may preferably have a thickness of from 0.1 μm to 1.0 μm, and more preferably, from 0.1 μm to 0.8 μm. The flattening layer having a thickness of less than 0.1 μm is insufficient for flattening the surface of the color layer, while the flattening layer having a thickness in excess of 1.0 μm would result in an excessive voltage drop upon application of the voltage. In addition to the function of flattening of the color filter surface, the flattening layer has a function of preventing short-circuiting between the transparent conductive particles exposed on the surface of the color layer and the counter electrode.

The pigments that constitute the color layer is not limited to particular species. Exemplary red pigments include perylene pigments, anthraquinone pigments, dianthraquinone pigments, azo pigments, diazo pigments, quinacridone pigments, anthracene pigments. The red pigment may typically be perylene pigment, quinacridone, naphthol AS, sicomin pigment, anthraquione (Sudan I, II, III, and R), dianthraquinonyl red, bisazo, or benzopyran.

Exemplary blue pigments include metal phthalocyanine pigments, indanthrone pigments, and indophenol pigments. The blue pigments may typically be a metal-phthalocyanine complex such as copper phthalocyanine, chloroaluminum phthalocyanine, titanylphthalocyanine, phthalocyanine vanadate, magnesium phthalooyanine, zinc phthalocyanine, iron phthalocyanine or cobalt phthalocyanine; or indophenol blue.

Exemplary green pigments include halogenated phthalocyanine pigments such as polychlorocopper phthalocyanine, and polychlorobromophthalocyanine.

The pigments as mentioned above may be used in combination with conventional violet, yellow, cyan, or magenta pigments.

A typical process for producing the color filter of the present invention comprises the steps of;

(a) forming a transparent conductive layer of a predetermined pattern on a transparent substrate;

(b) preparing a micelle colloid dispersion by dispersing the pigment and the transparent conductive particles having the hydrophobic surface in a medium containing a redox reactive surfactant and an electrolyte; and (c) carrying out an electrolysis in said micelle colloid dispersion by utilizing the transparent conductive layer on the transparent substrate produced in the step(a) for the anode to deposit a color layer comprising the pigment and the transparent conductive particles on the transparent conductive layer.

Typical surfactant added in the dispersion medium is a ferrocene derivative. Exemplary ferrocene derivatives are those represented by formula (4):

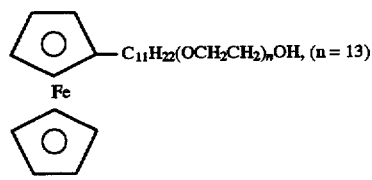

and formula (5)

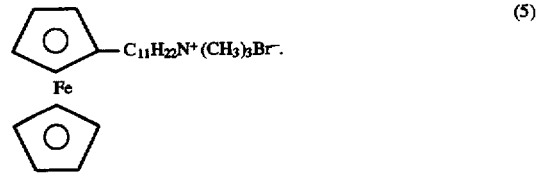

A commercially available product such as Ferrocenyl PEG (manufactured by Dojin Kagaku Kenkyusho) may be used for the ferrocene derivative represented by formula (4), and a commercially available product such as Ferrocenyl TMA (manufactured by Dojin Kagaku Kenkyusho) may be used for the ferrocene derivative represented by formula (5).

Concentration of the surfactant in the dispersion medium may be suitably determined in accordance with the type of the pigment and the transparent conductive particles dispersed. The concentration of the surfactant is typically in the range of from 0.05 mM/l to 12 mM/l, and, preferably, in the range of from 0.5 mM/l to 6 mM/l. The concentration of the surfactant lower than such range is likely to result in aggregation and precipitation of the particulate components, in particular, the organic pigment. The concentration of the surfactant in excess of such range would result in a significantly reduced speed of deposition, and the film deposited would be easily peel off.

The electrolyte added in the dispersion medium is not limited to any particular species. Typical electrolytes are sulfates, halogenide, and acetate of lithium, sodium, potassium and magnesium. The concentration of the electrolyte is typically in the range of from 0.005M to 0.2M.

Preferably, the electrolysis of step (c) is carried out at a voltage in the range of from 0.2 V to 1.3 V against saturated calomel electrode (SCE). When the voltage is in such range, the ferrocene derivative is readily oxidized, and the film deposited would be peel resistant. The temperature of the electrolyte solution may be determined so that the film is deposited at a constant rate and the substances dispersed in the electrolyte solution is prevented from aggregation. The desirable range is, for example, from 10° C. to 50° C.

The transparent conductive particles having the hydrophobic surface used in the present invention are produced, for example, by introducing a functional group onto base transparent conductive particles comprising ITO, tin oxide or the like, and allowing the coupling agent or the hydrophobic monomer to react with said base transparent conductive particles via said functional group. The introduction of the functional group onto the base particles may be effected by a dry treatment such as treatment with corona discharge, RF plasma, UV light, glow discharge, ozone, or the like; or a wet treatment wherein the base particles are reacted with an alcohol in the presence of an oxidizing agent such as peroxide to introduce alcoholic hydroxyl group.

By introducing a functional group onto the surface of the base transparent conducive particles as described above, density of the hydrophobic compound that is subsequently introduced onto the base particles can be fully increased. It is also effective to preliminarily pulverize the base particles to separate the particles that have been aggregated. It would be preferable to have the base particles pulverized into an average particle size of from 25 Å to 1,000 Å.

The colloids in the micelle colloid dispersion prepared in the above-described step (b) may preferably have an average colloid particle size of from 1,000 Å to 7,000 Å. The term, average colloid particle size used herein designates the one that is measured with a laser particle size distribution analyzer (LPA3100, manufactured by Ohtsuka Electronics) after diluting 0.06 ml of the micelle colloid dispersion (electrolyte solution) with 3 ml of pure water. When the average colloid particle size is limited within the above-specified range, the resulting color layer exhibits good results including favorable resistance value, surface flatness, and light transmission.

In the process of the micelle electrolysis, the redox reactive surfactant is adsorbed on the pigment particles and the transparent conductive particles to form micelle colloid particles, and thus formed micelle colloid particles are oxidized on the surface of the anode to become decomposed. The pigment particles and the transparent conductive particles would then be deposited on the anode surface to form a film.

when the micelle electrolysis as described above is employed for the formation of the color layer, the transparent conductive layer constituting the color filter can be used for the anode in the electrolysis, and by selecting the electrodes in the transparent conductive layer that are applied with voltage, the color layer of desired color may be conveniently formed on the selected electrodes. Employment of the micelle electrolysis is thus advantageous.

In addition, when the color filter of the present invention is formed by micelle electrolysis, formation of a color layer comprising the pigment particles and the transparent conductive particles free from the resin component is enabled. The thickness of this color layer can then be reduced at the maximum approximately 50% of the color layer wherein the particles are disposed in the resin component, and such a reduction in the thickness leads to a reduced voltage drop at the color layer upon application of the voltage.

However, the method for forming the color layer of the color filter of the present invention is not limited to such micelle electrolysis. The color layer may be formed by a coating method wherein a dispersion (i.e. color resin) containing the pigment, the transparent conductive particles having the hydrophobic surface, and a photo curing resin is prepared, and the dispersion is coated and cured on the transparent conductive layer using photolithography or etching technique to thereby form the color layer.

BEST MODE FOR CARRYING OUT THE INVENTION

Embodiments and Examples 1 to 12 are directed to color filters produced by micelle electrolysis. These embodiments and examples are provided for purposes of illustration and are not intended to be construed in a limiting sense.

EMBODIMENT AND EXAMPLE 1

FIG. 1 is a schematic cross sectional view of the color filter of this example of the invention. In FIG. 1, a color filter 100 comprises a transparent substrate 10, a transparent conductive layer 12 formed on the transparent substrate 10, a color layer 14 formed on the transparent conductive layer 12, and a flattening layer 16 covering the surface of the color layer 14.

The transparent substrate 10 comprises a transparent glass or resin having a thickness of from 0.7 mm to 1.1 mm.

The transparent conductive layer 12 comprises a film of ITO having a thickness of from 0.05 μm to 0.3 μm. The transparent conductive layer 12 comprises, for example, 300 stripe shaped electrodes 12a, 12b, 12c . . . each having a length of 40 mm and a width of 150 μm, arranged at a pitch of 170 μm within a rectangular region with a diagonal of 2.6 inches in the central portion of the transparent substrate 10. The ITO electrodes 12a, 12b, 12c . . . constituting the transparent conductive layer 12 are insulated from each other by intervening black matrix layers 15.

The color layer 14 comprises red (R) pixels 14a, green (G) pixels 14b and blue (B) pixels 14c arranged in a predetermined pattern, and in the case of this example, in stripes. The black matrix layer may be formed between the pixels, if necessary.

The feature of the color filter 100 is that the color layer 14 includes transparent conductive particles with hydrophobic surfaces from 5% to 50% by volume, and preferably, from 10% to 50% by volume. We confirmed that because of the transparent conductive particles of such content in the color layer, the color layer has an improved conductivity as evidenced by the reduced specific resistivity. As will be demonstrated by more specific data, the specific resistivity of the color layer may be regulated to the range of from $10^{-1}$ $\Omega \cdot cm$ to $10^8$ $\Omega \cdot cm$, and preferably from $10^{-1}$ $\Omega \cdot cm$ to $10^7$ $\Omega \cdot cm$, which is approximately $10^2$ in the order of magnitude lower than the specific resistivity in the color layer not including such transparent conductive particles.

The transparent conductive particles are rendered hydrophobic by introducing a silane coupling agent (3-glycidoxypropyltrimethoxysilane) on the surfaces of ITO particles (base particles). It is confirmed that after such treatment, the transparent conductive particles have a contact angle with water (2θ) of from about 15° to 138°, demonstrating a markedly improved hydrophobicity over the untreated ITO particles, whose contact angle with water (2θ) is from 0° to 1°. The term, contact angle with water herein designates the contact angle (2θ) of water droplet on the surface of a tablet that has been produced by compressing the transparent conductive particles at a pressure of 200 kg/cm² into a tablet with a diameter of 1 cm and a thickness of 0.1 mm.

As will be described later, the color layer 14 of this example has been deposited by micelle electrolysis and basically comprises two components, i.e. pigment and the transparent conductive particles. Accordingly, the layer of the present invention free from a resin component can be formed into a film thinner than the color layer formed by coating a coating fluid (color resin) wherein pigment is dispersed in a resin.

The color layer 14 may preferably have a thickness of from 0.6 μm to 1.6 μm. The color layer thinner than 0.6 μm will have insufficient color characteristics, while the color layer thicker than 1.6 μm will have an excessive light shielding effect, leading to a reduced light transmittance of the resulting color filter.

Difference in the thickness between the pixels 14a, 14b and 14c constituting the color layer 14 may preferably be within 0.2 μm. Care should be taken especially for the color filter used in STN display device since visually recognizable inconsistency in color and contrast would be induced by inconsistent gaps between the pixels to result in a poor display quality.

Preferably, the red, green and blue pixels may have a thickness of from 0.8 μm to 1.6 μm, from 0.7 μm to 1.3 μm, and 0.6 μm to 1.2 μm, respectively. The upper limits of the tolerable thickness ranges have been primarily determined for the purpose of limiting an increase in the specific resistivity of the color layer, whereas the lower limits have been imposed in view of the color characteristics of the resulting color filter. Also, when the thickness of the pixels exceeds such upper limits, light transmittance of the color layer will be excessively reduced due to absorption by the transparent conductive particles of visible lights, in particular lights with a wavelength of 500 nm or less. It is confirmed for a blue pixel containing a phthalocyanine pigment that the transmittance of the light with the wavelength in the vicinity of 460 nm would be reduced to 60% or less when the thickness of the pixel exceeds 1.2 μm.

The flattening layer 16 comprises a transparent resin such as an acrylic resin (JSS-8, manufactured by Japan Synthetic Rubber Co., Ltd.), and has a thickness of from 0.1 μm to 1 μm. The flattening layer with a thickness of less than 0.1 μm is insufficient to fully flatten the surface irregularity of the color layer while the flattening layer with a thickness in excess of 1 μm would have a substantial resistance by itself to interfere with the effort of reducing the resistance of the color filter. If desired, an orienting layer 18 may be formed on the flattening layer 16 to a thickness of from 0.01 μm to 0.1 μm. The orienting layer comprises, for example, a polyimide resin, a polyvinyl alcohol, or an organic silane compound.

Next, an exemplary process for producing the color filter 100 is described.

(A) First, the transparent conductive layer 12 comprising the electrodes 12a, 12b, 12c . . . is formed on a glass transparent substrate (7059, manufactured by Corning) by depositing an ITO film to a thickness of 1,000 Å by sputtering, and by forming electrodes 12a, 12b, 12c . . . of a predetermined pattern by photolithography and etching process. The electrode pattern of the transparent conductive layer 12 is determined according to the arrangement of the pixels of the color layer 14. In this example, the electrodes are patterned in stripes.

(B) Next, the color layer 14 is deposited by micelle electrolysis using electrolyte solutions of colors, R, G and B, respectively. In the micelle electrolysis, voltage is selectively applied to every third electrodes of the transparent conductive layer 12 to form the color films of the respective colors. The electrolytic conditions include an electrolytic voltage against a saturated calomel electrode of 0.5 V, and electrolytic periods for red, green and blue of 20 min., 10 min. and 7 min., respectively.

The electrolyte solution used are micelle colloid dispersions prepared by adding the respective organic pigment and the hydrophobic ITO particles to a medium (pure water) containing a surfactant having redox reactivity and an electrolyte, and dispersing the organic pigment and the ITO particles in the medium by a ultrasonic homogenizer.

Composition of the Electrolyte Solution (1) Electrolyte Solution for Red

| | |
|---|---|
| Organic Pigment (a mixture of an anthraquinone pigment (red) and an azo pigment (yellow) at a ratio of 9:1) | 6 g/liter |
| Hydrophobic ITO Particles | 1.8 g/liter |
| Surfactant (Ferrocenyl PEG, manufactured by Dojin Chemical) | 2.2 g/liter |
| Supporting Electrolyte (LiBr) | 4 g/liter |

(2) Electrolyte Solution for Green

| | |
|---|---|
| Organic Pigment (a mixture of a phthalocyanine green pigment (green) and an azo pigment (yellow) at a ratio of 8:2) | 10 g/liter |
| Hydrophobic ITO Particles | 3 g/liter |
| Surfactant (Ferrocenyl PEG, manufactured by Dojin Chemical) | 2.2 g/liter |
| Supporting Electrolyte (LiBr) | 4 g/liter |

(3) Electrolyte Solution for Blue

| | |
|---|---|
| Organic Pigment (a mixture of a phthalocyanine pigment (blue) and an azo pigment (yellow) at a ratio of 9:1) | 7 g/liter |
| Hydrophobic ITO Particles | 2.1 g/liter |
| Surfactant (Ferrocenyl PEG, manufactured by Dojin Chemical) | 2.2 g/liter |
| Supporting Electrolyte (LiBr) | 4 g/liter |

The hydrophobic ITO particles dispersed in preparing the above-described electrolyte solutions are ITO particles (manufactured by Sumitomo Metal Mining; average primary particle diameter, 300 Å to 400 Å) which have been rendered hydrophobic by placing 5 g of the ITO particles in 200 ml Kjerdahl flask; adding to the flask 100 g of a solution of 5% by weight of 3-glycidoxypropyltrimethoxysilane in toluene; and refluxing the mixture at 120° C. for 20 hours to promote coupling.

After completing the electrolysis using electrolyte solutions of respective colors, the resulting substrate is lightly washed, and baked at 180° C. for 30 minutes.

The resulting RGB color layer has a thickness of 0.8 μm (red), 0.7 μm (green), and 0.6 μm (blue), respectively, and a specific resistivity of $10^8$ Ω·cm (red), $10^7$ Ω·cm (green), and $10^8$ Ω·cm (blue).

(C) Next, the black matrix layer 15 is formed by conventional photolithography technique, and the flattening layer 16 is formed on the color layer 14 and the black matrix layer 15 to a thickness of about 0.1 µm. The flattening layer 16 may be formed, for example, by coating a thermosetting acrylic resin (JSS-8, manufactured by Japan Synthetic Rubber Co., Ltd.) by spin coating, and heating the article in an oven at 180° C. for 30 minutes to cure the coating. The orienting layer 18 is formed on the flattening layer 16. The orienting layer 18 may be formed, for example, by spin coating a polyimide resin (SP740, manufactured by Toray Industries.) to a thickness of 400 Å, and heating the article at 250° C. for 1 hour. Thus formed orienting layer 18 is subjected to a rubbing in accordance with the conventional method. It should be noted that the black matrix layer 15 may be formed prior to the color layer 14.

Characteristics Test

A liquid crystal display device is assembled using thus produced color filter to test the driving characteristic.

Figure 3:
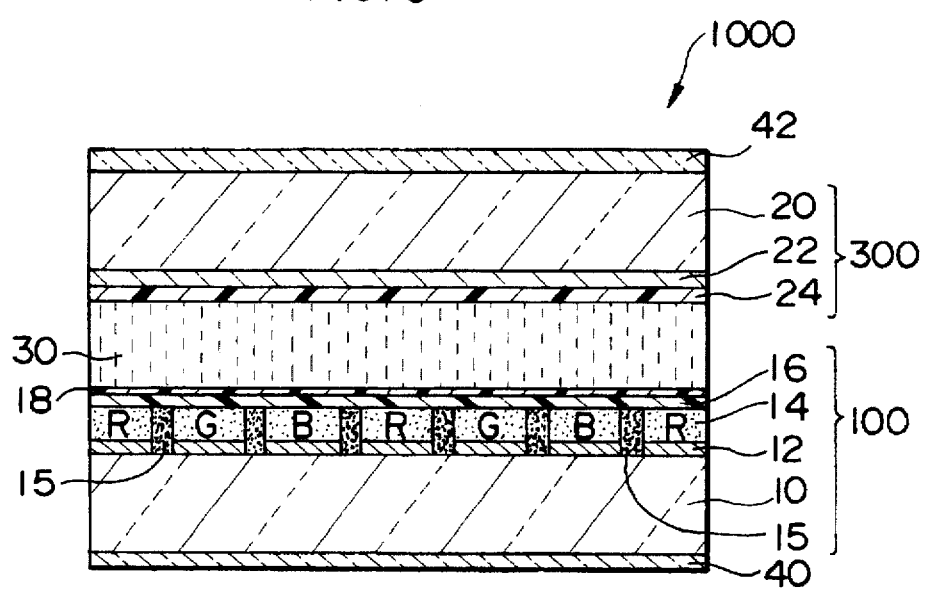
FIG. 3 is a schematic cross sectional view of a liquid crystal display device wherein the color filter of Example 1 is incorporated.

The sample to be used is a liquid crystal display device 1000 shown in FIG. 3 which has been constructed by placing a counter substrate 300 comprising a transparent substrate 20, an ITO layer 22 of a predetermined pattern formed on the transparent substrate 20, and an orienting layer 24 formed on the ITO layer 22 to be opposed to the color filter 100 to form a cell with a cell. gap of 10 µm; providing STN liquid crystal 30 in the cell; and laminating polarizing plates (manufactured by Nitto Denko).

Figure 4:
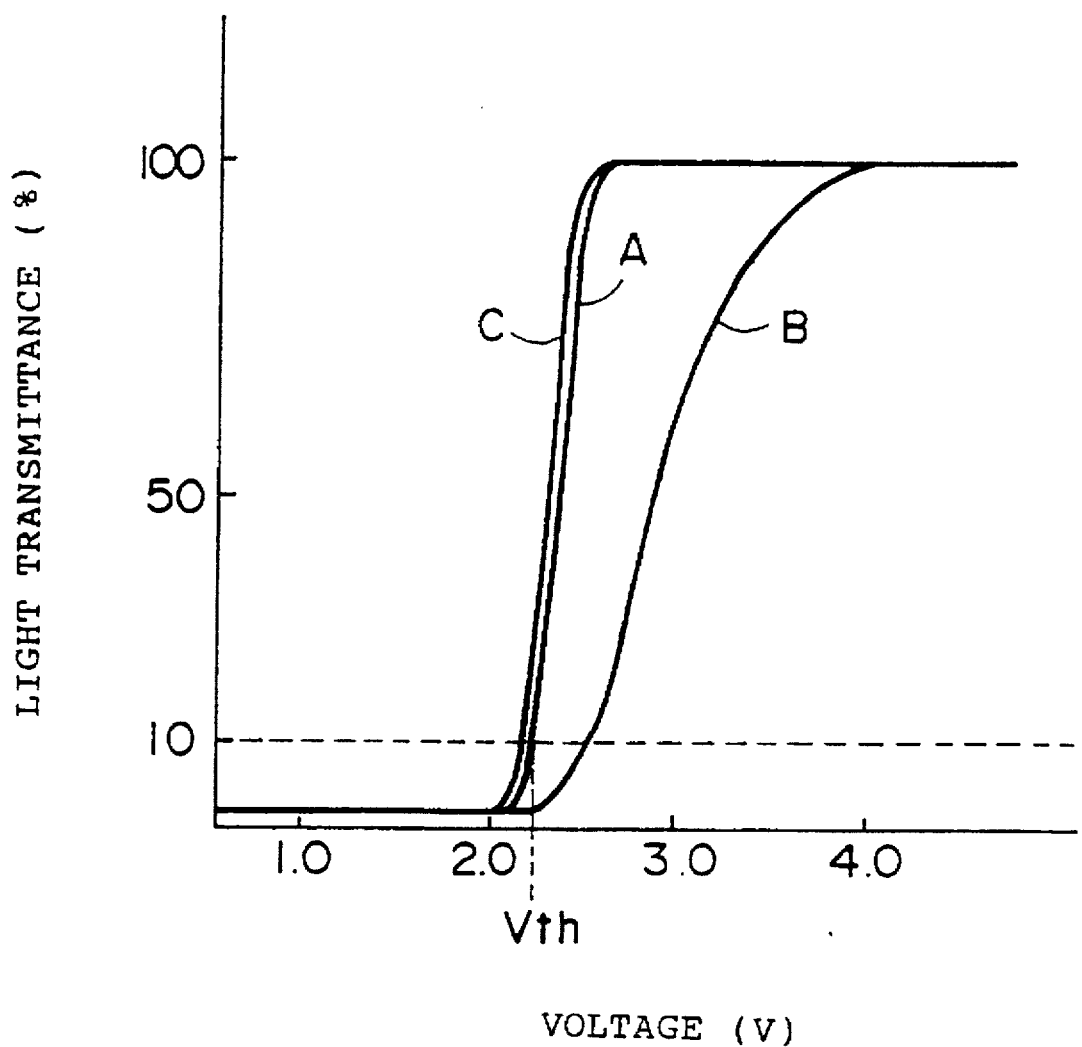
FIG. 4 shows the voltage-light transmittance curve determined for the liquid crystal display device of Example 1.

The liquid crystal display device 1000 is evaluated for its voltage-light transmittance characteristic (V-T curve). The results are shown in FIG. 4. In FIG. 4, curve A represents the characteristics of the sample of this example; curve C represents the characteristics of a liquid crystal display device which is identical with the sample of this example except for the absence of the color layer; and curve B represents the characteristics of a liquid crystal display device which includes a color filter for comparison which is identical with the color filter used in the sample of this example except that the formed color layer is free from the transparent conductive particles. In evaluating the voltage-light transmittance characteristic, 1/1 duty ratio static drive is employed. The V-T curve of FIG. 4 represents the measurement for the area with a diameter of about 2 mm around the center of the sample display device.

It is confirmed from the results shown in FIG. 4 that the liquid crystal display device utilizing the color filter of this example (curve A) has excellent voltage-light transmittance characteristics substantially equivalent to those of the liquid crystal display device free from the color layer (curve C). On the contrary, in the case of the liquid crystal display device utilizing the color filter wherein the color layer is free from hydrophobic transparent conductive particles (curve B), the rise of the curve is not as steep as that of the liquid crystal display device free from the color layer (curve C), and also, the threshold voltage shifts to the side of the higher voltage.

The threshold voltage of the sample is measured for the pixels of each color. The results are shown below. The term, threshold voltage used herein is the voltage when the light transmittance is 10%. The threshold voltages for the comparative sample utilizing a color filter wherein the color layer is free from the hydrophobic transparent conductive particles are also shown for comparison purpose.

|       | Sample | Comparative Sample |
|-------|--------|--------------------|
| Red   | 2.24 V | 2.60 V             |
| Green | 2.18 V | 2.52 V             |
| Blue  | 2.20 V | 2.45 V             |

As shown above, the sample utilizing the color filter of this example wherein the color layer contains the transparent conductive particles with the hydrophobic surface has threshold voltages about 0.25 to 0.36 V lower than those of the comparative sample. In addition, it is confirmed that, in the sample of this example, difference in the threshold voltage between the pixels of red, green and blue is significantly smaller than that of the comparative sample. That enables to uniformize the electric characteristics of the pixels.

Steepness of the rise of the voltage-light transmittance curve is evaluated in terms of the ratio of the driving voltage at a light transmittance of 10% to the voltage at a light transmittance of 90% for each color. The ratio is about 1.03 in the sample of this example while it is in the range of from 1.05 to 1.09 in the comparative sample. Since a steeper rise of the curve results in the driving voltage ratio in the vicinity of 1, it is confirmed that the sample of this example has a rise steeper than the comparative sample. Since the sample has a steepness at the rise of such level, the minimum required contrast is secured when driven at 1/400 duty ratio.

When a liquid crystal display device of active matrix drive with MIM element is prepared by using the color filter of this example, it is also confirmed that the voltage-light transmittance characteristic curve of the liquid crystal display device shows a steep rise. For example, the display device in normally white mode shows a steep rise when it is driven at a voltage in the range of from 20 to 23 V, which is the voltage range optimal for driving, and a contrast of 120:1 at the maximum is obtained.

EMBODIMENT AND EXAMPLE 2

In this example, treatment of the transparent conductive particles to render the particles hydrophobic and formation of the color layer are mainly described.

The transparent conductive particles having the hydrophobic surface are prepared as described below.

In 200 ml Kjerdahl flask, 5 g of ITO particles (manufactured by Sumitomo Metal Mining; average primary particle diameter, 300 Å to 400 Å) is put, and 100 g of a toluene solution containing 5% by weight of trimethoxysilane is added. The mixture is then refluxed at 60° C. for 50 hours to promote coupling. After the completion of the reaction, the particles are separated by centrifugation, washed with methanol, and dried at 110° C.

The resulting particles are evaluated for their stability upon dispersion as described below. First, 3 g of the dried particles is put in a 30 ml test tube, and toluene is added. The mixture is stirred for 6 hours. 1 ml of the dispersion near the surface is aliquoted in a vial at a predetermined time after the termination of the stirring, and the toluene is evaporated. The residual particles in the vial are weighed to evaluate the dispersibility of the particles. For comparison purpose, dispersibility in toluene is also evaluated for the ITO particles which have not been subjected to the coupling treatment, as well as for fully dried commercially purchased ITO ink. The results are shown in Table 1.

TABLE 1

| Sample | Weight in Gram of the Residual Particles | | |
|---|---|---|---|
|  | 24 hr. | 48 hr. | 72 hr. |
| Particles Treated by Coupling | 0.11 | 0.08 | 0.05 |
| Particles of ITO Ink | 0.00 | 0.00 | 0.00 |
| Particles not Treated by Coupling | 0.00 | 0.00 | 0.00 |

As evident in Table 1, no particles are present in the samples collected from the surface of the dispersion prepared by using the ITO ink and the dispersion prepared by using the untreated ITO particles after 24 hours from the termination of the stirring to indicate the full precipitation of the particles. On the contrary, the dispersion prepared by using the ITO particles which have been treated by coupling retains good dispersibility even after 72 hours from the termination of the stirring.

Next, formation of the color layer is described.

In a 30 ml test tube, 3 g of the ITO particles which have been treated by coupling is put, and toluene is added. The mixture is stirred for 6 hours, and subjected to centrifugation in a centrifuge (HIMAC CENTRIFUGE CR5DL, manufactured by Hitachi) at a rotation speed of 3,000 rpm for 10 minutes. The centrifugate is further subjected to decantation in acetone to isolate the ITO particles.

The resulting hydrophobic ITO particles and a copper phthalocyanine pigment are used to prepare the colloid dispersion of the following composition:

| monochlorocopper phthalocyanine | 5 g/liter |
|---|---|
| Ferrocenyl PEG | 1.6 g/liter |
| LiBr | 10.6 g/liter |
| hydrophobic ITO particles | 11.8 g/liter |

The colloid dispersion is prepared by agitating the above-described composition for 2 hours with an ultrasonic dispersion apparatus; leaving the dispersion for half a day, and collecting the supernatant of the dispersion. The colloid dispersion is evaluated for its particle size distribution with a laser particle size distribution analyzer. It is then confirmed that the colloid dispersion has a particle size distribution with its peak at 1,800 Å.

A transparent glass substrate having formed thereon ITO electrodes of a predetermined pattern and a piece of stainless steel plate are immersed in the colloid dispersion, and electrolysis is then carried out at a constant voltage of +0.4 V for 20 minutes by using the ITO electrodes for the anode and the stainless steel plate for the cathode to thereby deposit a blue color layer on the ITO electrodes.

The resulting substrate is washed with water, and baked at 180° C. for 30 minutes. The resulting blue color layer has a consistent thickness of 0.7 μm with substantially no difference in the thickness between the electrodes and the vicinity of the electrodes. The color layer has a content of the hydrophobic ITO particles of 25% by volume. The hue of the blue color layer is substantially the same as that of the color layer free from the ITO particles. The specific resistivity of the color layer is measured to be $1 \cdot 10^6$ Ω·cm, indicating the sufficient conductivity of the color layer. Moreover, the above described micelle electrolysis procedure is carried out by using the colloid dispersion of the ITO particles which have been allowed to stand for 2 weeks, and the specific resistivity of the resulting color layer is measured to be $1 \cdot 10^6$ Ω·cm, which is substantially the same as the specific resistivity of the color layer obtained by using the colloid dispersion immediately after its preparation.

The procedure as described above is repeated by using the untreated non-hydrophobic ITO particles in preparing the colloid dispersion to evaluate the dispersibility of such ITO particles and the specific resistivity of the color layer prepared therefrom. The particles in this comparative colloid dispersion that are floating in the dispersion medium immediately after the termination of the stirring, however, are observed to become precipitated after half a day. The color layer of this comparative sample has a specific resistivity of $1 \cdot 10^{10}$ Ω·cm.

EMBODIMENT AND EXAMPLE 3

Figure 5:
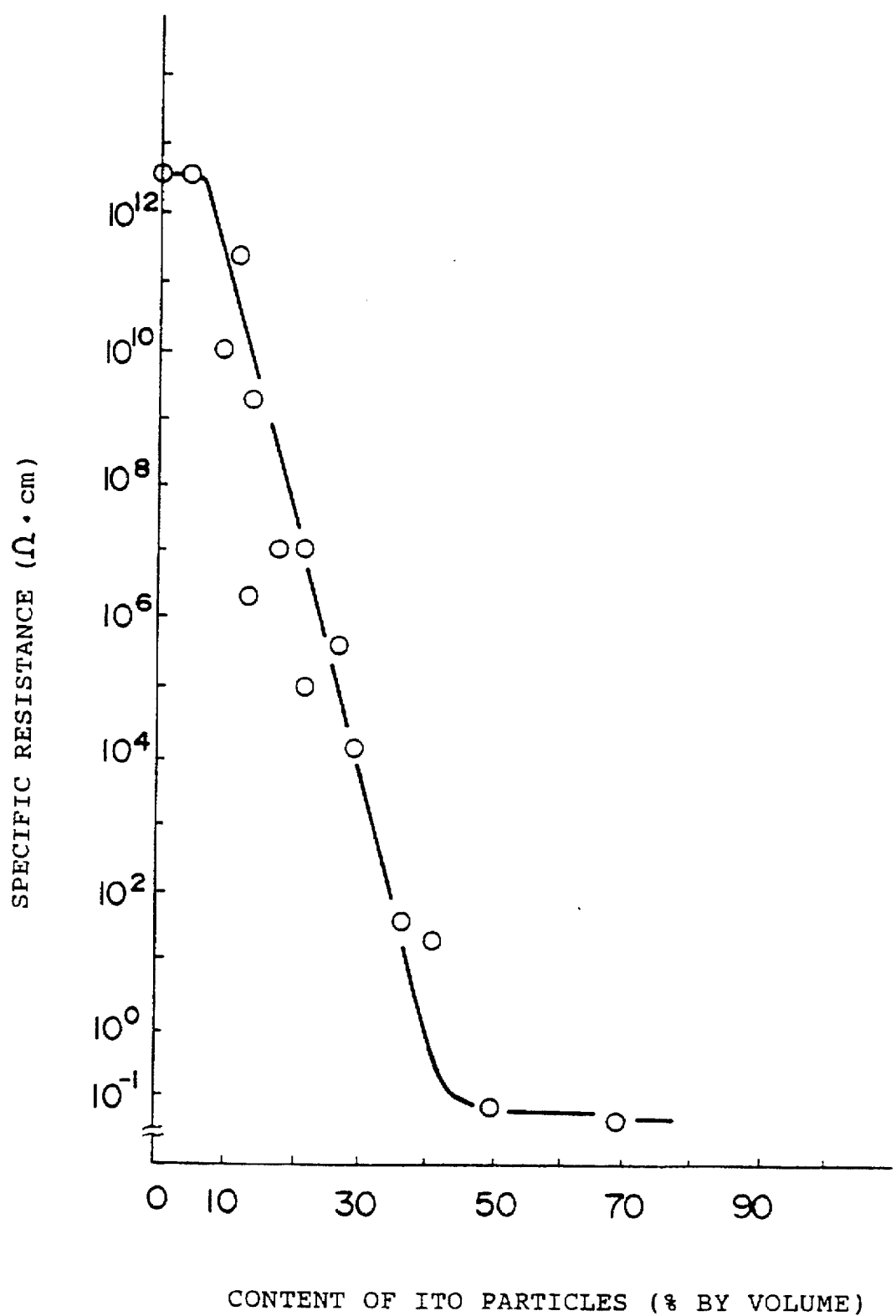
FIG. 5 diagrammatically illustrates the specific resistivity of the color layer in relation to the content of the ITO particles.

A series of 14 color filters are prepared by repeating the same process of Embodiment and Example 2 except the content of the hydrophobic ITO particles. The resulting color filters are respectively measured for the specific resistivity of the color layer. The results are shown in FIG. 5 wherein the specific resistivity in the axis of ordinates is shown in relation to the content of the ITO particles in the axis of abscissa. The colloid dispersion formed in this example is measured to have an average colloid particle size of about 2,100 Å with a laser particle size distribution analyzer.

As shown in FIG. 5, when the content of the ITO particles exceeds 10% by volume of the color layer (pigment plus ITO particles), the specific resistance decreases to less than approximately $1 \cdot 10^{10}$ Ω·cm to indicate an increase in the conductivity. It should be noted that the color layer free from the ITO particles has a specific resistivity of about $1 \cdot 10^{12}$ Ω·cm. It is also confirmed that the specific resistivity of the color layer would remain at the level of approximately $10^{-1}$ Ω·cm when the content of the ITO particles exceeds 50% by volume, and content of the ITO particles in excess of such level would not result in a considerable reduction in the value of the specific resistivity.

EMBODIMENT AND EXAMPLE 4

In this example, 5 g of ITO particles (manufactured by Sumitomo Metal Mining; average primary particle diameter, 300 Å to 400 Å) are aliquoted in plastic bags at 1 g per plastic bag, and are subjected to a corona discharge treatment at 15 kV for 5 minutes at an electrode distance of 2 mm. 5 g of the thus corona discharge treated ITO particles are put in a 200 ml Kjerdahl flask, and 50 g of toluene is added to the flask to be subjected to ultrasonic waves for 1 hour. After that, the 50 g of toluene solution containing 10% by weight of trimethylchlorosilane is slowly dropped into this mixture, while application of ultrasonic waves is continued for 1 more hour. This suspension is then refluxed at 120° C. for 18 hours under stirring with a magnetic stirrer to promote coupling. During reflux, the suspension is subjected to ultrasonic waves for 1 hour after every 5 hours. The particles in the resulting dispersion are separated by centrifugation, washed with methanol, and dried at 110° C.

The resulting particles are evaluated for their dispersibility in the same way as the procedure of Embodiment and Example 2. For comparison, the dispersibility of the ITO particles which have been subjected to the coupling treatment without the corona discharge treatment, and/or the ITO particles which have not been subjected to ultrasonic waves during the coupling treatment is also evaluated. The results are shown in Table 2.

TABLE 2

| Corona Discharge Treatment | Ultrasonic Waves | Weight in Gram of the Residual Particles | | |
|---|---|---|---|---|
| | | 24 hr. | 48 hr. | 72 hr. |
| Yes | Yes | 0.11 | 0.10 | 0.09 |
| Yes | No | 0.10 | 0.09 | 0.07 |
| No | Yes | 0.10 | 0.09 | 0.07 |
| No | No | 0.10 | 0.07 | 0.04 |

As evident in Table 2, it is confirmed that the corona discharge treatment and application of ultrasonic waves during the coupling treatment result in an improved dispersibility of the resulting hydrophobic ITO particles.

Thus obtained ITO particles having the hydrophobic surface are used to prepare the colloid dispersion as described below, and the procedure of Embodiment and Example 2 is repeated to form a color layer. The colloid dispersion formed in this example is measured to have an average colloid particle size of about 2,400 Å with a laser particle size distribution analyzer.

Colloid Dispersion

| Monochlorocopper Phthalocyanine | 5 g/liter |
| --- | --- |
| Ferrocenyl PEG | 1.6 g/liter |
| LiBr | 10.5 g/liter |
| Hydrophobic ITO Particles | 8.0 g/liter |

The resulting color layer has a thickness of about 1 μm and a specific resistivity of 1 $10^{7.8}$ Ω·cm.

EMBODIMENT AND EXAMPLE 5

ITO particles are subjected to a corona discharge treatment by repeating the procedure of Embodiment and Example 4. 5 g of thus corona discharge treated ITO particles are put in a 500 ml stainless steel beaker, and 50 g of toluene is added to the beaker. The mixture is strongly agitated for 6 hours with a metal propeller stirrer, while the mixture is subjected to ultrasonic waves. 50 g of toluene solution containing 10% by weight of trimethyldichlorosilane is then slowly dropped to the mixture, while agitation and application of ultrasonic waves are continued for another 1 hour. The particles in the resulting dispersion are separated by centrifugation, washed with methanol, and dried at 110° C.

In a 30 ml test tube are placed 3 g of the resulting ITO particles, and toluene is added thereto. The mixture is subjected to ultrasonic waves for 1 hour, and then, evaluated for the average particle size of the ITO particles and the presence of precipitates. For comparison, the average particle size and the presence of precipitates are also evaluated for the dispersion prepared by using the ITO particles which have been subjected to the coupling treatment with no agitation by the metal propeller stirrer. The results are shown in Table 3.

TABLE 3

| Sample | Average Particle Size (Å) | Precipitates |
| --- | --- | --- |
| With Agitation | 3,000 | Present |
| Without Agitation | 1,500 | Absent |

The results of Table 3 reveal that the dispersibility of the particles is improved by the coupling treatment under agitation. It is also revealed that the average particle size of the ITO particles is reduced by the coupling treatment under agitation.

The procedure of Embodiment and Example 4 is repeated by using thus obtained ITO particles having the hydrophobic surface to form a color layer. The resulting color layer has a thickness of 1 μm and a specific resistivity of 1 $10^{7.8}$ Ω·cm. The colloid dispersion formed in this example is measured to have an average colloid particle size of about 2,200 Å with a laser particle size distribution analyzer.

EMBODIMENT AND EXAMPLE 6

Tin oxide particles having an average particle size of about 400 Å are produced by pulverizing 100 g of tin oxide particles in a ball mill. The resulting particles are placed in a plastic bag and discharge treated in an RF discharge-oxygen plasma generator at a pressure of 0.4 Torr by applying a power of 100 W for 30 minutes. 30 g of thus treated particles are placed in a 500 ml stainless steel beaker, and 150 g of toluene is added thereto. The mixture is strongly agitated for 1 hour with a metal propeller stirrer while the mixture is subjected to ultrasonic waves. 150 g of toluene solution containing 10% by weight of dimethylchlorophenylsilane is then slowly dropped into the mixture, while agitation and application of ultrasonic waves are continued for another 1 hour. After that, the suspension is poured into a Kjerdahl flask, and refluxed at 120° C. for 18 hours under stirring with a magnetic stirrer. During reflux, the suspension is subjected to ultrasonic waves for 1 hour after every 5 hours. The particles in the resulting dispersion are separated by centrifugation, washed with methanol, and dried at 110° C.

The resulting tin oxide particles are evaluated for their dispersibility in toluene by repeating the procedure of Embodiment and Example 2. For comparison, the dispersibility in toluene is also evaluated for the tin oxide particles which have been subjected to the coupling treatment without pulverizing in the ball mill. The results are shown in Table 4.

TABLE 4

| Sample | Weight in Gram of the Residual Particles | | |
| --- | --- | --- | --- |
| | 24 hr. | 48 hr. | 72 hr. |
| Tin Oxide Particles | | | |
| Treated in a Ball Mill | 0.11 | 0.11 | 0.11 |
| Untreated Particles | 0.11 | 0.10 | 0.08 |

The results of Table 4 reveal that the dispersibility of the tin oxide particles is improved by pulverizing the tin oxide particles in the ball mill prior to the coupling treatment.

The procedure of Embodiment and Example 4 is repeated by using thus obtained tin oxide particles having the hydrophobic surface to form a color layer. The resulting color layer has a thickness of about 1 μm and a specific resistivity of 1 $10^{7.8}$ Ω·cm. The colloid dispersion formed in this example is measured to have an average colloid particle size of about 2,000 Å with a laser particle size distribution analyzer.

EMBODIMENT AND EXAMPLE 7

Tin oxide particles having an average particle size of about 80 Å are produced by pulverizing 100 g of tin oxide particles in a ball mill, and the resulting particles are placed in a beaker. A high-pressure UV lamp (400 W) is then inserted in the beaker, and the tin oxide particles are irradiated with the ultraviolet light for 1 hour while the particles are agitated with a magnetic stirrer. In a glass tube of 18 mm diameter are placed 5 g of the thus irradiated particles, and then, 15 g of toluene solution containing 30% by weight of methyl methacrylate, and the tube content is deaerated by lyophilization, and sealed. The sealed tube is subjected to ultrasonic waves in a temperature controlled bath at 60° C. for 1 hour where the content of the tube is vigorously vibrated to thereby promote polymerization. After the completion of the polymerization, the particles in the resulting dispersion are separated by centrifugation, washed with methanol, and dried at 110° C. The resulting dried particles are evaluated for their dispersibility in toluene by repeating the procedure of Embodiment and Example 2. For comparison, the dispersibility in toluene is also evaluated for the tin oxide particles that have not been polymerized. The results are shown in Table 5.

TABLE 5

| Sample | Weight in Gram of the Residual Particles | | |
|---|---|---|---|
| | 24 hr. | 48 hr. | 72 hr. |
| Tin Oxide Particles | | | |
| Treated by Polymerization | 0.11 | 0.11 | 0.11 |
| Untreated Particles | 0.00 | 0.00 | 0.00 |

The results shown in Table 5 reveal that the dispersibility of the tin oxide particles would be improved by graft polymerizing the monomer having the hydrophobic organic group. On the contrary, it is confirmed that the particles with no such graft polymerization treatment would all precipitate in 24 hours.

The procedure of Embodiment and Example 4 is repeated by using thus obtained tin oxide particles having the hydrophobic surface to form a color layer. The resulting color layer has a thickness of about 1 μm and a specific resistivity of $1 \cdot 10^{6.5}$ Ω·cm. The colloid dispersion formed in this example is measured to have an average colloid particle size of about 1,500 Å with a laser particle size distribution analyzer.

EMBODIMENT AND EXAMPLE 8

In a 200 ml Kjerdahl flask are placed 10 g of the ITO particles (manufactured by Sumitomo Metal Mining; average primary particle diameter, 300 Å to 400 Å) that have been preliminarily pulverized in a ball mill. To the flask are added 1 g of benzoyl peroxide and 30 ml of isopropylalcohol, and the mixture is refluxed at 45° C. for 50 hours. The particles are then extracted in a Soxhlet's extractor using chloroform to remove the unreacted benzoyl peroxide. The resulting particles are dried with infrared radiation, and then, under vacuum at 110° C. for 24 hours to produce the ITO particles in which alcoholic hydroxyl group is introduced.

In a 500 ml stainless steel beaker, 5 g of thus produced particles are placed and 45 g of methylethylketone is added thereto. The mixture is strongly agitated with a metal propeller stirrer for 6 hours under ultrasonic waves. To the resulting suspension, 50 g of the toluene solution containing 10% by weight of isopropyltri(isostearoyl) titanate is dropped slowly, and the suspension is stirred at room temperature for 1 hour under ultrasonic waves to promote coupling. The particles in the resulting dispersion are separated by centrifugation, washed with methanol, and dried at 110° C.

The resulting particles are evaluated for their dispersibility in toluene by repeating the procedure of Embodiment and Example 2. For comparison purpose, the dispersibility in toluene is also evaluated for the ITO particles that have been coupling-treated without introducing OH group by treating the particles with an alcohol. The results are shown in Table 6.

TABLE 6

| Sample | Weight in Gram of the Residual Particles | | |
|---|---|---|---|
| | 24 hr. | 48 hr. | 72 hr. |
| ITO Particles | | | |
| Treated With an Alcohol | 0.12 | 0.10 | 0.11 |
| Untreated Particles | 0.00 | 0.00 | 0.00 |

The results of Table 6 reveal that the dispersibility of the particles would be improved by introducing hydroxyl group in the ITO particles before treating the particles by coupling. On the contrary, it is confirmed that the particles with no alcohol treatment would all precipitate within 24 hours.

The procedure of Embodiment and Example 4 is repeated by using thus obtained ITO particles having the hydrophobic surface to form a color layer. The resulting color layer has a thickness of about 1 μm and a specific resistivity of $1 \cdot 10^{7.8}$ Ω·cm. The colloid dispersion formed in this example is measured to have an average colloid particle size of about 2,000 Å with a laser particle size distribution analyzer.

EMBODIMENT AND EXAMPLE 9

Figure 6:
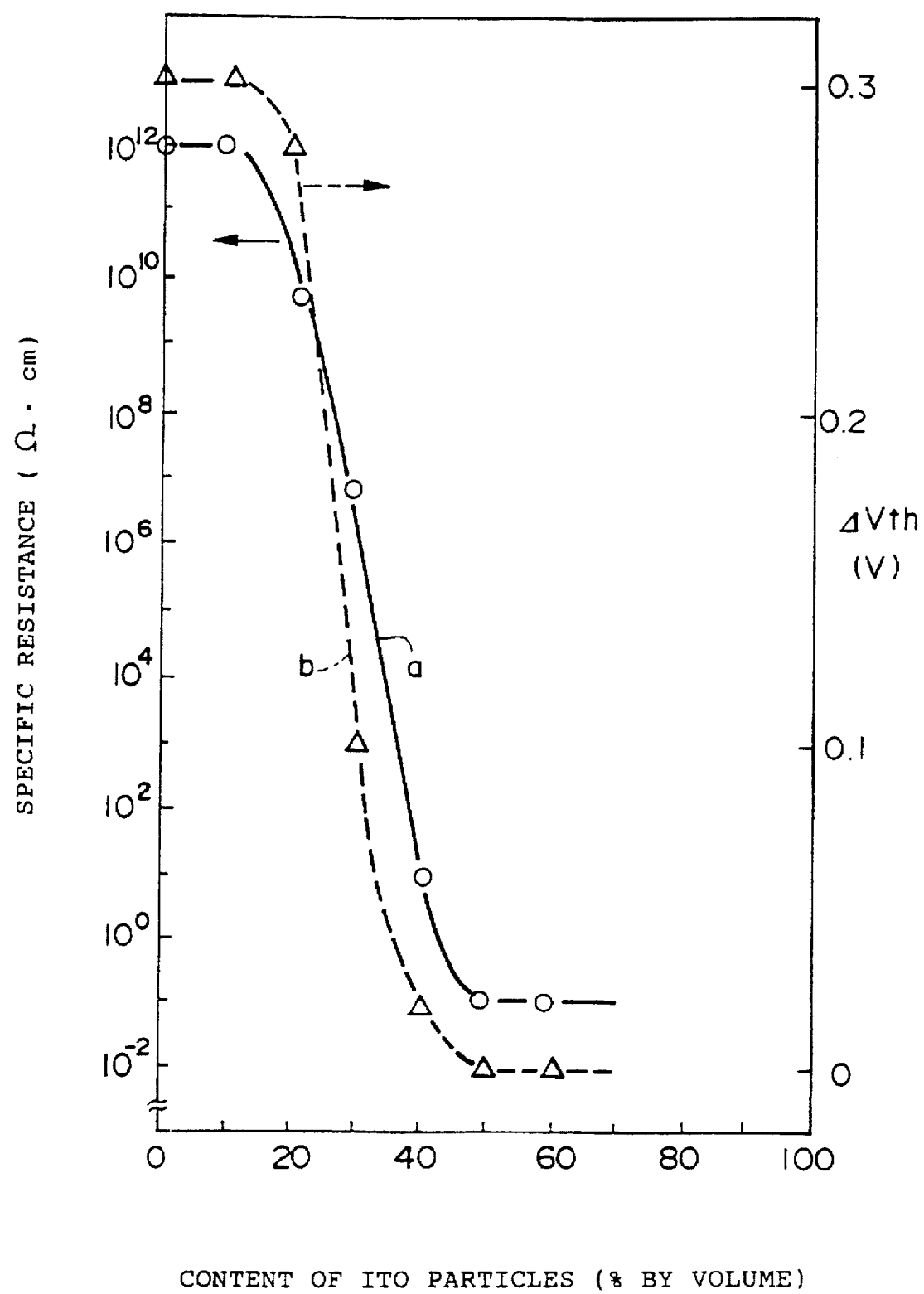
FIG. 6 diagrammatically illustrates the specific resistivity in relation to the content of the ITO particles, as well as the $\Delta V_{th}$ in relation to the content of the ITO particles.

The procedure of Embodiment and Example 4 is repeated to produce ITO particles having a surface that has been rendered hydrophobic with trimethylchlorosilane. A series of 6 liquid crystal display devices are then prepared by repeating the procedure of Embodiment and Example 1 except that the content of the ITO particles in the color layer of the color filter is varied. A liquid crystal display device wherein the color layer of the color filter is free from the ITO particles is also prepared for comparison. The resulting liquid crystal display devices are evaluated for their specific resistivity and difference in threshold voltage. The term, difference in threshold voltage designates the difference ($\Delta V_{th}$) in the threshold voltage between the liquid crystal display device with no color layer and the liquid crystal display device with a color layer. The results are shown in FIG. 6. In FIG. 6, curve a shows the specific resistivity in relation to the content of the ITO particles, and curve b shows the $\Delta V_{th}$ in relation to the content of the ITO particles.

As shown in FIG. 6, both the specific resistivity and the $\Delta V_{th}$ are markedly depending on the content of the ITO particles in a quite similar manner. The decrease in the specific resistivity becomes remarkable when the content of the ITO particles exceeds about 20% by volume, and the decrease in the specific resistivity and the $\Delta V_{th}$ stops and substantially constant specific resistivity and $\Delta V_{th}$ are shown when the content of the ITO particles exceeds 50% by volume. A content of the hydrophobic ITO particles in the range of from 20% to 50% by volume is preferred in view of both the specific resistivity and the $\Delta V_{th}$.

The ITO particles in the color layer of the color filter used in this example have an average primary particle size of from 400 Å to 500 Å.

Liquid crystal display device samples A and B are also prepared by using ITO particles having an average primary particle size of from 900 Å to 1000 Å for the color layer of the color filter at different contents. The samples are evaluated for their specific resistivity and the $\Delta V_{th}$.

The results are shown in Table 7 together with the data for the comparative sample wherein the color layer of the color filter is free from the ITO particles.

TABLE 7

| | Primary Average Particle Size (Å) | Content (% by vol.) | Specific Resistivity (Ω · cm) | $\Delta V_{th}$, (V) |
|---|---|---|---|---|
| Comparative Sample | — | 0 | $1 \times 10^{12}$ | 0.3 |
| Sample A | 900–1000 | 30 | $1 \times 10^{7.2}$ | 0.10 |
| Sample B | 900–1000 | 50 | $1 \times 10^{0.2}$ | 0.00 |

EMBODIMENT AND EXAMPLE 10

Figure 7:
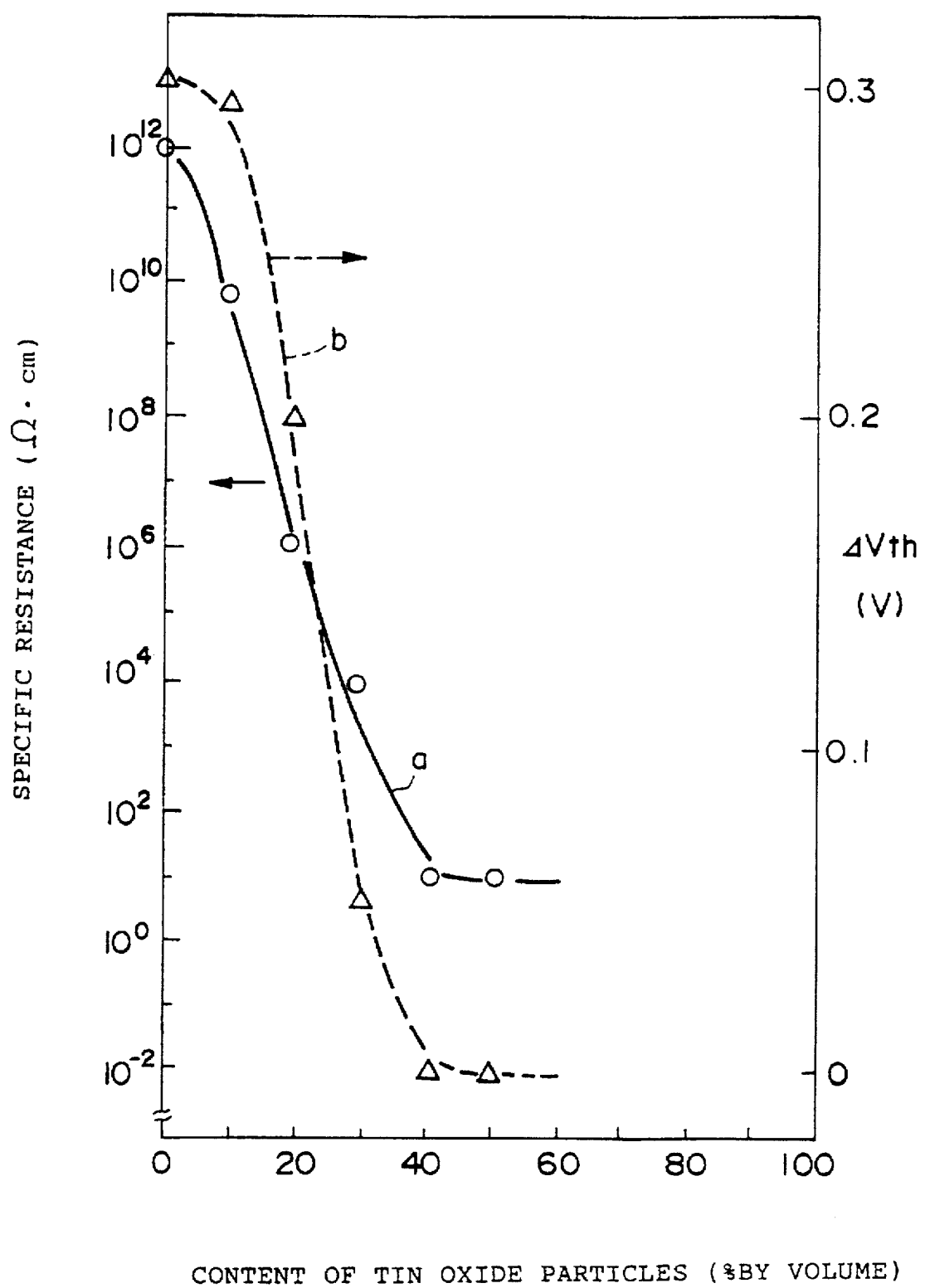
FIG. 7 diagrammatically illustrates the specific resistivity in relation to the content of the tin oxide particles, as well as the $\Delta V_{th}$ in relation to the content of the tin oxide particles.

The procedure of Embodiment and Example 9 is repeated except that the ITO particles used in Embodiment and Example 9 are replaced with tin oxide particles to produce the tin oxide particles having hydrophobic surface, and then, the liquid crystal display devices. Thus produced liquid crystal display devices are evaluated for their specific resistivity and the $\Delta V_{th}$. The results are shown in FIG. 7. In FIG. 7, curve a shows the specific resistivity in relation to the content of the tin oxide particles, and curve b shows the $\Delta V_{th}$ in relation to the content of the tin oxide particles.

As evidently shown in FIG. 7, both the specific resistivity and the $\Delta V_{th}$ are markedly depending on the content of the tin oxide particles in a quite similar manner, as in the case of the Embodiment and Example 9 wherein ITO particles are used. The decrease in the specific resistivity and the $\Delta V_{th}$ becomes remarkable when the content of the tin oxide particles exceeds about 10% by volume, and the decrease in the specific resistivity and the $\Delta V_{th}$ stops and substantially constant specific resistivity and $\Delta V_{th}$ are shown when the content of the ITO particles exceeds 40% by volume. A content of the hydrophobic tin oxide particles in the range of from 10% to 40% by volume is preferred in view of both the specific resistivity and the $\Delta V_{th}$.

The tin oxide ($SnO_2$) particles in the color layer of the color filter used in this example have an average primary particle size of from 50 Å to 100 Å, and about 3% by weight of Sb doped therein.

EMBODIMENT AND EXAMPLE 11

The procedure of Embodiment and Example 1 is repeated except that the flattening layers are deposited to a thickness of 0.1 μm, 0.3 μm, 0.5 μm, 0.8 μm and 1.0 μm to produce liquid crystal display devices. A liquid crystal display device having no flattening layer is also prepared for comparison purpose. In the liquid crystal display devices, the content of the hydrophobic ITO particles in the color layer of the color filter is 50% by volume.

The liquid crystal display devices are evaluated for their $\Delta V_{th}$ and alignment characteristic. The term, alignment characteristic used herein refers to whether the liquid crystal molecules are orderly aligned in the direction of rubbing. In the region of the liquid crystal display device panel with poor alignment characteristic where the liquid crystals are randomly aligned, on/off control of the light transmission by the application of voltage can not be conducted. Therefore, disorder in the alignment of the liquid crystal molecules is visually noticeable as an inconsistent appearance.

Figure 8:
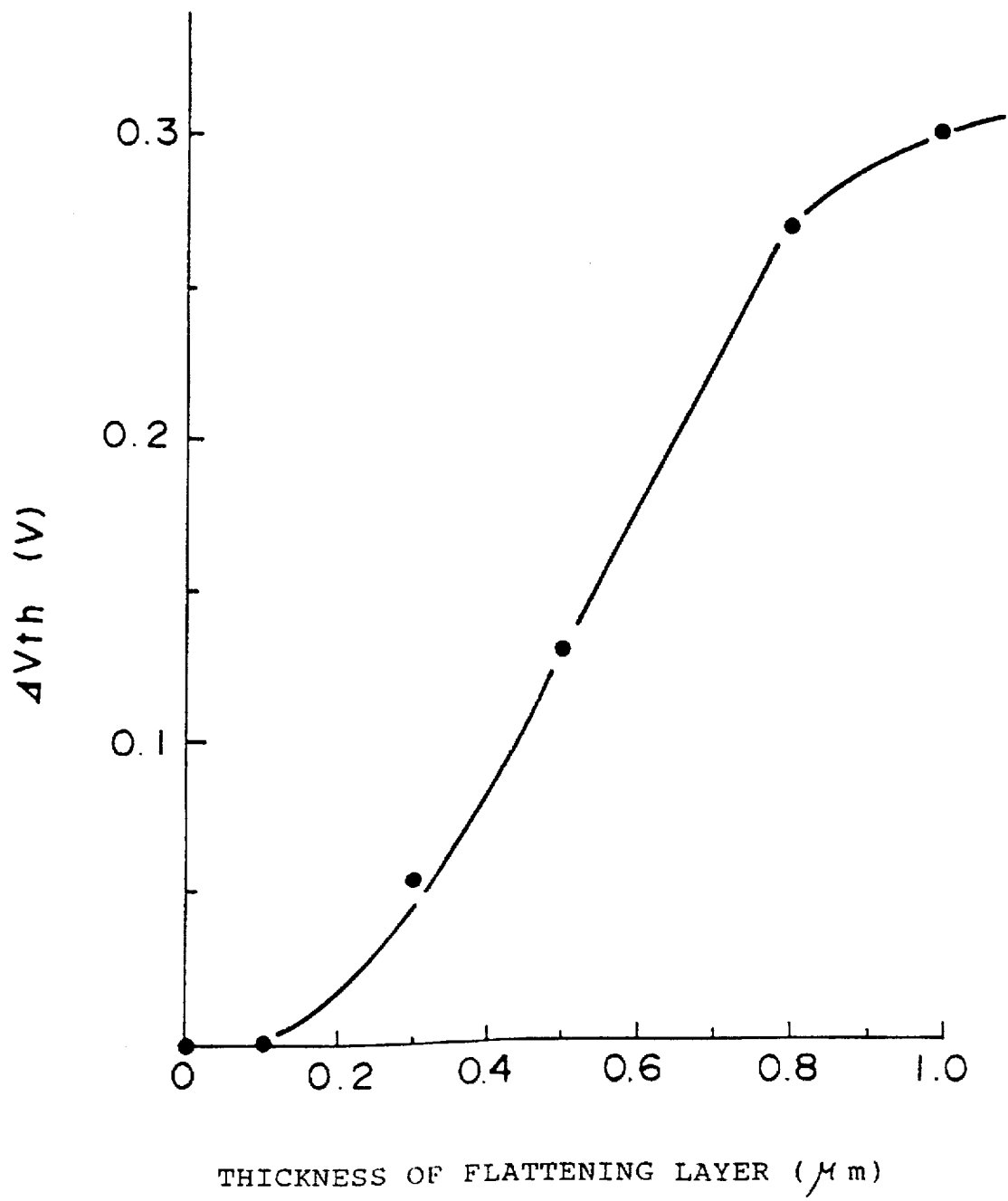
FIG. 8 diagrammatically illustrates the $\Delta V_{th}$ in relation to the thickness of the flattening layer.

FIG. 8 shows the $\Delta V_{th}$ in relation of the thickness of the flattening layer.

As shown in FIG. 8, the $\Delta V_{th}$ undergoes a substantially linear increase with the increase in the thickness of the flattening layer. When the thickness of the flattening layer exceeds 1.0 μm, the $\Delta V_{th}$ exceeds 0.3 to cancel the effect of the increase in the conductivity of the color layer. Therefore, the thickness of the flattening layer may preferably be less than 1.0 μm, and more preferably, less than 0.8 μm in view of the threshold voltage.

With regard to the alignment characteristic, it is confirmed that the liquid crystal display device would exhibit an inconsistent appearance when the color filter has no flattening layer, and deposition of the flattening layer to a thickness of 0.1 μm or more would result in a consistent appearance, indicating the improved alignment characteristics of the liquid crystals.

In view of the alignment characteristic and the threshold voltage as described above, the flattening layer may preferably have a thickness of from 0.1 μm to 1.0 μm, and more preferably, a thickness of from 0.1 μm to 0.8 μm.

EMBODIMENT AND EXAMPLE 12

The procedure of Embodiment and Example 5 is repeated except that the dimethyldichlorosilane used for the coupling agent in Embodiment and Example 5 is replaced with isopropyl tris(dioctylpyrophosphate) titanate to prepare the ITO particles having the hydrophobic surface.

Some types of ITO particles that have been rendered hydrophobic by the coupling treatment using the above-mentioned titanate compound are evaluated for their contact angle with water by repeating the procedure of Embodiment and Example 1. The contact angle is measured to be from 69° to 138°, indicating high hydrophobicity of the hydrophobic ITO particles.

Thus prepared ITO particles with the hydrophobic surface are used for the preparation of the micelle colloid electrolyte solutions each having the composition as shown in Table 8. The electrolyte solutions are prepared by applying ultrasonic waves to the composition mixture for 2 hours; treating the product with a high pressure homogenizer (Microfluidizer, manufactured by Mizuho Kogyo) for dispersion; centrifuging the dispersion at a rotation speed of 1500 rpm for 3 minutes; and collecting the supernatant. The pigments have an average primary particle size of 400 Å (red), 700 Å (green), and 1,000 Å (blue).

The resulting dispersions are evaluated for their average colloid particle size with a laser particle size analyzer. The average colloid particle size of each color is in the range of from 2,400 Å to 2,800 Å (red), from 5,000 Å to 6,000 Å (green), and from 1,500 Å to 2,500 Å (blue), respectively.

TABLE 8

| Sample No. | Dianthra-quinonyl red (g/l) | Phthalo-cyanine green (g/l) | Monochloro-Cu phthalo-cyanine (g/l) | Ferrocenyl PEG (g/l) | LiBr (g/l) | ITO particles (g/l) |
|---|---|---|---|---|---|---|
| 1 | 9.0 | — | — | 3.4 | 10.5 | 9 |
| 2 | 9.0 | — | — | 4.3 | 10.5 | 18 |
| 3 | 9.0 | — | — | 6.1 | 10.5 | 36 |
| 4 | 9.0 | — | — | 9.7 | 10.5 | 72 |
| 5 | — | 11.2 | — | 1.9 | 1.05 | 9 |
| 6 | — | 11.2 | — | 4.5 | 1.05 | 15 |
| 7 | — | 11.2 | — | 5.1 | 1.05 | 18 |
| 8 | — | 11.2 | — | 5.1 | 1.05 | 18 |
| 9 | — | 11.2 | — | 12.3 | 1.05 | 54 |
| 10 | — | — | 6.0 | 1.9 | 10.5 | 6 |
| 11 | — | — | 6.0 | 2.2 | 10.5 | 8 |
| 12 | — | — | 6.0 | 2.65 | 10.5 | 11 |
| 13 | — | — | 6.0 | 11.8 | 10.5 | 72 |
| 14 | 9.0 | — | — | 2.5 | 10.5 | 0 |

The transparent substrate having the ITO electrodes of a predetermined pattern formed on a glass substrate and the stainless steel plate are immersed in each of the resulting colloid dispersion, and electrolysis is conducted by using the ITO electrodes for the anode and the stainless steel plate for the cathode. The voltage and period of the electrolysis are 0.8 V and 15 minutes (red), 0.6 V and 15 minutes (green), and 0.8 V and 15 minutes (blue), respectively. The temperature of the electrolyte solution is 23° C. The resulting substrate is then washed with water for 3 minutes, and baked at 180° C. for 30 minutes. Thus produced color filters are not those wherein red, green and blue colors are arranged, but those comprising single-color color layer.

A series of liquid crystal display devices are produced by using thus produced color filters by repeating the procedure of Embodiment and Example 1 except that the flattening layer is deposited to 0.2 μm. The resulting liquid crystal display devices are evaluated for their driving characteristic ($V_{th}$, $\Delta V_{th}$). The results are shown in Table 9 together with the content of the ITO particles, the specific resistivity and thickness of the color layer. In Table 9, the data shown for Sample No. 15 are those obtained for a liquid crystal display device wherein the color filter is free from the color layer.

TABLE 9

| Sample No. | ITO particles (% by vol.) | Specific resistivity (log, Ω · cm) | Thickness (μm) | $V_{th}$ (V) | $\Delta V_{th}$ (V) |
|---|---|---|---|---|---|
| 1 | 5 | 8.0 | 0.8 | 2.260 | 0.200 |
| 2 | 8 | 6.5 | 0.9 | 2.110 | 0.050 |
| 3 | 10 | 6.0 | 0.9 | 2.104 | 0.044 |
| 4 | 53 | −1.0 | 1.6 | 2.065 | 0.005 |
| 5 | 4 | 7.9 | 0.7 | 2.140 | 0.080 |
| 6 | 8 | 6.3 | 0.7 | 2.100 | 0.040 |
| 7 | 15 | 6.0 | 0.8 | 2.094 | 0.034 |
| 8 | 18 | 5.4 | 0.8 | 2.090 | 0.030 |
| 9 | 40 | −1.0 | 1.3 | 2.063 | 0.003 |
| 10 | 5 | 8.0 | 0.6 | 2.200 | 0.140 |
| 11 | 7 | 6.4 | 0.65 | 2.110 | 0.050 |
| 12 | 10 | 6.0 | 0.7 | 2.106 | 0.046 |
| 13 | 50 | −1.0 | 1.2 | 2.065 | 0.005 |
| 14 | 0 | 12.0 | 1.0 | 2.300 | 0.24 |
| 15 | — | — | — | 2.060 | — |

As evident in Table 9, it is confirmed that addition of the ITO particles with the hydrophobic surface in the color layer would result in an improved conductivity of the color layer as demonstrated in the reduced specific resistivity of the color layer. It is also confirmed that addition of the hydrophobic ITO particles would result in a remarkable decrease in the $\Delta V_{th}$, the $\Delta V_{th}$ undergoing a decrease with the increase in the content of the ITO particles. It is then actually confirmed that the liquid crystal display device with the content of the ITO particles in the color layer of approximately 5% by volume would exhibit a contrast of about 5:1 when driven at 1/100 duty ratio, and the liquid crystal display device with the content of approximately 10% by volume or more would exhibit a contrast of more than 10:1 when driven at 1/240 duty ratio, which is of commercially acceptable level for a large sized liquid crystal display device used in personal computers or word processors.

Embodiment and Examples 13 to 19 are directed to color filters wherein the transparent conductive particles are dispersed in a resin.

EMBODIMENT AND EXAMPLE 13

The procedure of Embodiment and Example 2 is repeated to produce the hydrophobic ITO particles, and the resulting ITO particles are used to prepare a coating fluid comprising the resin dispersion of the following composition:

| | |
|---|---|
| Photosensitive Resin (CT, manufactured by Fuji Hunt Electronics, Co., Ltd.) | 100 parts by weight |
| ITO Particles Having the Hydrophobic Surface | 50 parts by weight |
| Monochlorocopper Phthalocyanine | 10 parts by weight |
| Ethylene Glycol Monobutyl Ether | 180 parts by weight |

The ingredients as described above are mixed, and the mixture is treated for 2 hours in an ultrasonic homogenizer (US-MODEL 600, manufactured by Nippon Seiki) for dispersion to produce a resin composition having the pigment dispersed therein (hereinafter referred to as resin dispersion).

The thus produced dispersion is confirmed to have a good dispersion stability with the particles being substantially uniformly dispersed in the resin. The resin dispersion is spin coated on a glass substrate having ITO electrodes formed thereon, and the coating is cured by irradiating the coating with light. The resulting color layer of about 1 μm thick is measured to have a specific resistivity of $1 \cdot 10^6$ Ω·cm to confirm its improved conductivity.

Figure 9:
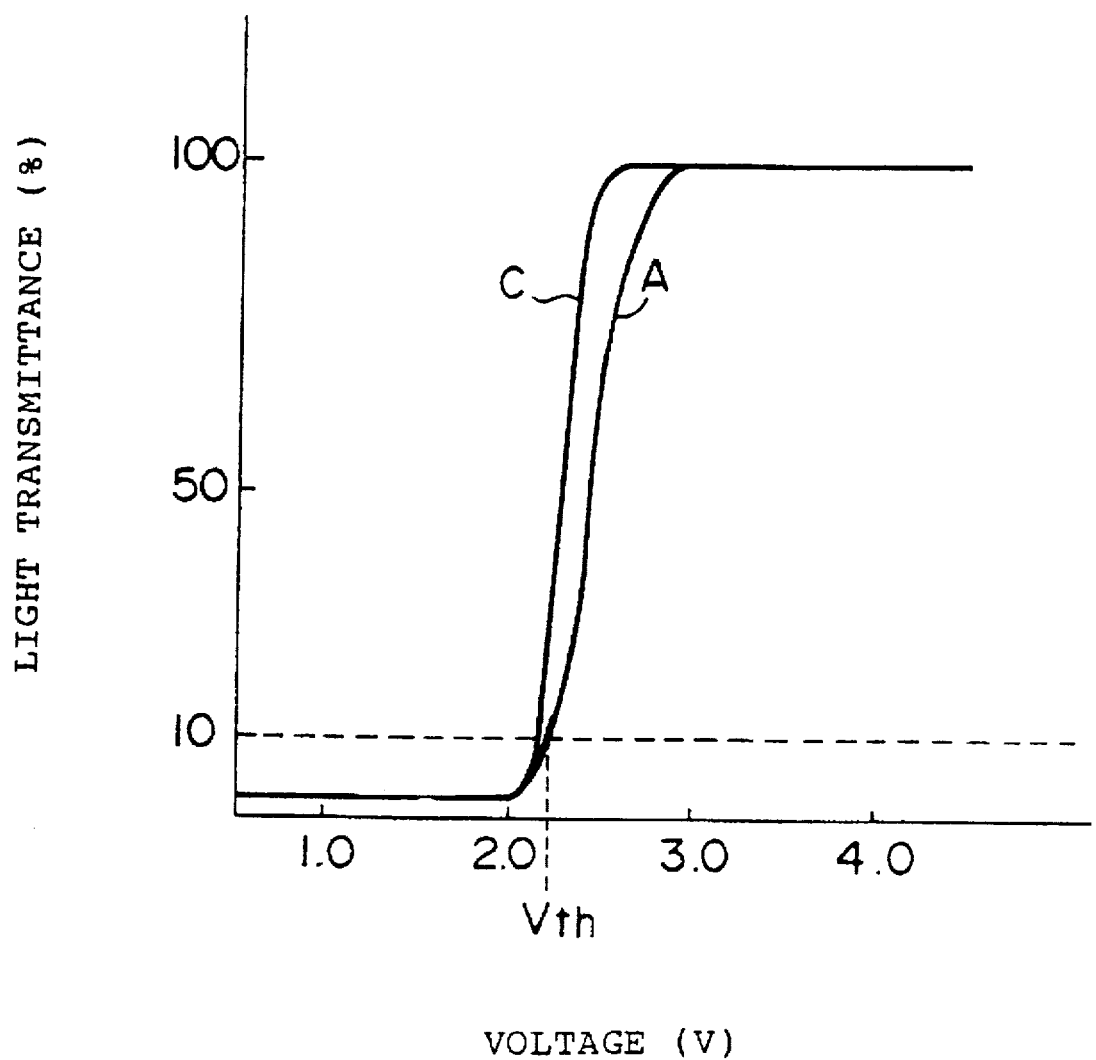
FIG. 9 shows the voltage-light transmittance curve determined for the liquid crystal display device wherein the color filter of Example 13 is incorporated.

The procedure of Embodiment and Example 1 is repeated by using the thus produced color filter to produce a series of liquid crystal display devices. The liquid crystal display devices are evaluated for their voltage-light transmission characteristic. The voltage-light transmission characteristic curve is shown in FIG. 9. In FIG. 9, curve A shows the characteristic of the liquid crystal display device sample of this example, and curve C shows the liquid crystal display device sample which has a structure identical with the sample of this example except for the absence of the color layer.

As evident in FIG. 9, the liquid crystal display device having the color filter of this example exhibits the driving characteristic which is substantially similar to that of the liquid crystal display device without the color layer, although the threshold voltage is slightly higher.

EMBODIMENT AND EXAMPLE 14

The procedure of Embodiment and Example 3 is repeated to produce the hydrophobic ITO particles, and the resulting ITO particles are used to prepare a resin dispersion of the following composition:

| | |
|---|---|
| Photosensitive Resin (CT, manufactured by Fuji Hunt Electronics Co., Ltd.) | 100 parts by weight |
| Hydrophobic ITO Particles | 45 parts by weight |
| Phthalocyanine Green (manufactured by BASF; particle size, 0.08 μm) | 15 parts by weight |
| Ethylene Glycol Monobutyl Ether | 180 parts by weight |

The ingredients as described above are mixed, and the mixture is processed for one day in a ball mill with steel balls of 15 mm in diameter for dispersion, and then, in the ultrasonic homogenizer used in Embodiment and Example 13 for 1 hour for further dispersion to thereby produce a resin dispersion wherein the pigment and the ITO particles are dispersed in the resin.

The resin dispersion is spin coated on a glass substrate having ITO electrodes formed thereon, and the coating is cured by irradiating the coating with light. The resulting color layer of about 1 μm thick is measured to have a specific resistivity of $1 \cdot 10^{7.8}$ Ω·cm.

EMBODIMENT AND EXAMPLE 15

The procedure of Embodiment and Example 5 is repeated to produce the hydrophobic ITO particles, and the resulting ITO particles are used to prepare a resin dispersion of the following composition:

| | |
|---|---|
| Photosensitive Resin (CT, manufactured by Fuji Hunt Electronics Co., Ltd.) | 100 parts by weight |
| Hydrophobic ITO Particles | 45 parts by weight |
| Phthalocyanine Green (manufactured by BASF; particle size, 0.08 μm) | 15 parts by weight |
| Ethylene Glycol Monobutyl Ether | 180 parts by weight |

The ingredients as described above are mixed, and the mixture is processed for one day in a ball mill with steel balls of 15 mm in diameter for dispersion, and then, in the ultrasonic homogenizer used in Embodiment and Example 13 for 1 hour for further dispersion to thereby produce a resin dispersion wherein the pigment and the ITO particles are dispersed in the resin.

The resin dispersion is spin coated on a glass substrate having ITO electrodes formed thereon, and the coating is cured by irradiating the coating with light. The resulting color layer of about 1 μm thick is measured to have a specific resistivity of $1 \ 10^{7.8}$ Ω·cm.

EMBODIMENT AND EXAMPLE 16

The procedure of Embodiment and Example 6 is repeated to produce the hydrophobic ITO particles, and the resulting ITO particles are used to prepare a resin dispersion of the following composition:

| | |
|---|---|
| Photosensitive Resin (CT, manufactured by Fuji Hunt Electronics Co., Ltd.) | 100 parts by weight |
| Hydrophobic tin oxide Particles | 45 parts by weight |
| Phthalocyanine Green (manufactured by BASF; particle size, 0.08 μm) | 15 parts by weight |
| Ethylene Glycol Monobutyl Ether | 180 parts by weight |

The ingredients as described above are mixed, and the mixture is processed for one day in a ball mill with steel balls of 15 mm in diameter for dispersion, and then, in a ultrasonic homogenizer for 1 hour for further dispersion to thereby produce a resin dispersion wherein the pigment and the ITO particles are dispersed in the resin.

The resin dispersion is spin coated on a glass substrate having ITO electrodes formed thereon, and the coating is cured by irradiating the coating with light. The resulting color layer of about 1 μm thick is measured to have a specific resistivity of $1 \ 10^{7.8}$ Ω·cm.

EMBODIMENT AND EXAMPLE 17

The procedure of Embodiment and Example 7 is repeated to produce the tin oxide particles having the hydrophobic surface, and the resulting tin oxide particles are used to prepare a resin dispersion of the following composition:

| | |
|---|---|
| Photosensitive Resin (CT, manufactured by Fuji Hunt Electronics Co., Ltd.) | 100 parts by weight |
| Hydrophobic ITO Particles | 45 parts by weight |
| Phthalocyanine Green (manufactured by BASF; particle size, 0.08 μm) | 15 parts by weight |
| Ethylene Glycol Monobutyl Ether | 180 parts by weight |

The ingredients as described above are mixed, and the mixture is processed for one day in a ball mill with steel balls of 15 mm in diameter for dispersion, and then, in a ultrasonic homogenizer for 1 hour for further dispersion to thereby produce a resin dispersion wherein the pigment and the tin oxide particles are dispersed in the resin.

The resin dispersion is spin coated on a glass substrate having ITO electrodes formed thereon, and the coating is cured by irradiating the coating with light. The resulting color layer of about 1 μm thick is measured to have a specific resistivity of $1 \ 10^{7.8}$ Ω·cm.

EMBODIMENT AND EXAMPLE 18

The procedure of Embodiment and Example 8 is repeated to produce the ITO particles having the hydrophobic surface, and the resulting ITO particles are used to prepare a coating fluid of resin dispersion type having the following composition:

| | |
|---|---|
| Photosensitive Resin (CT, manufactured by Fuji Hunt Electronics Co., Ltd.) | 100 parts by weight |
| Hydrophobic ITO Particles | 45 parts by weight |
| Phthalocyanine Green (manufactured by BASF; particle size, 0.08 μm) | 15 parts by weight |
| Ethylene Glycol Monobutyl Ether | 180 parts by weight |

The ingredients as described above are mixed, and the mixture is processed for one day in a ball mill with steel balls of 15 mm in diameter for dispersion, and then, in a ultrasonic homogenizer for 1 hour for further dispersion to thereby produce a resin dispersion wherein the pigment and the ITO particles are dispersed in the resin.

The resin dispersion is spin coated on a glass substrate having ITO electrodes formed thereon, and the coating is cured by irradiating the coating with light. The resulting color layer of about 1 μm thick is measured to have a specific resistivity of $1 \ 10^{7.8}$ Ω·cm.

EMBODIMENT AND EXAMPLE 19

The procedure of Embodiment and Example 5 is repeated except that the dimethyldichlorosilane used for the coupling agent in Embodiment and Example 5 is replaced with isopropyl tris(dioctylpyrophosphate) titanate to prepare the ITO particles having the hydrophobic surface. The resulting ITO particles are dispersed in 180 parts by weight of ethylene glycol monobutyl ether together with 100 parts by weight of a photosensitive resin (CT, manufactured by Fuji Hunt Electronics Co., Ltd.) and 15 parts by weight of the pigment shown in Table 10 to produce resin dispersion. The red, green, and blue pigments have an average primary particle size of 400 Å, 700 Å, and 1000 Å, respectively. In preparing the resin dispersion, the ingredients are mixed, and the mixture is processed for one day in a ball mill with steel balls of 15 mm in diameter for dispersion, and then, in a ultrasonic homogenizer for 1 hour for further dispersion as in the case of Embodiment and Example 14. The components are uniformly dispersed in the resulting dispersion.

The resulting resin composition is spin coated on a glass substrate having ITO electrodes formed thereon as used in Embodiment and Example 13, and thus coated substrate is baked at 180° C. for 30 minutes to form a color layer having a thickness of 1 μm.

A series of liquid crystal display devices are produced by repeating the procedure of Embodiment and Example 1 by using the thus produced color filters. The resulting liquid crystal display devices are evaluated for the threshold voltage and the difference in threshold voltage, $\Delta V_{th}$. The results are shown in Table 10 together with the specific resistivity and the content of the ITO particles in the color layer. In Table 10, the data shown for Sample No. 11 are those obtained for a liquid crystal display device wherein the color filter is free from the color layer.

TABLE 10

| Sample No. | Pigment | ITO particles (% by vol.) | Specific resistivity (log, Ω·cm) | $V_{th}$ (V) | $\Delta V_{th}$ (V) |
|---|---|---|---|---|---|
| 1 | Dianthraquinonyl red | 10 | 7.9 | 2.255 | 0.195 |
| 2 | Dianthraquinonyl red | 20 | 6.5 | 2.110 | 0.050 |
| 3 | Dianthraquinonyl red | 50 | −1.1 | 2.061 | 0.001 |
| 4 | Phthalocyanine green | 10 | 8.0 | 2.140 | 0.080 |
| 5 | Phthalocyanine green | 20 | 6.0 | 2.100 | 0.040 |
| 6 | Phthalocyanine green | 50 | −1.1 | 2.060 | 0.000 |
| 7 | Monochlorocopper phthalocyanine | 10 | 7.9 | 2.160 | 0.100 |
| 8 | Monochlorocopper phthalocyanine | 20 | 6.2 | 2.110 | 0.050 |
| 9 | Monochlorocopper phthalocyanine | 50 | −1.1 | 2.061 | 0.001 |
| 10 | Dianthraquinonyl red | 0 | 12 | 2.310 | 0.250 |
| 11 | — | — | — | 2.060 | — |

As evidently shown in Table 10, it is confirmed that addition of the ITO particles with the hydrophobic surface in the color layer would result in the improved conductivity of the color layer as demonstrated in the reduced specific resistivity of the color layer. It is also confirmed that addition of the hydrophobic ITO particles would result in a remarkable decrease in the $\Delta V_{th}$, the $\Delta V_{th}$ undergoing a decrease with the increase in the content of the ITO particles. It is then actually confirmed that the liquid crystal display device with the content of the ITO particles in the color layer of approximately 10% by volume would exhibit a contrast of about 5:1 when driven at 1/100 duty ratio, and the liquid crystal display device with the content of approximately 20% by volume or more would exhibit a contrast of more than 10:1 when driven at 1/240 duty ratio, which is of commercially acceptable level for a large sized liquid crystal display device used in personal computers or word processors.

As discussed above, a color filter (100) for a liquid crystal display device comprising an optically transparent substrate (10), a transparent conductive layer (12) formed on the substrate, and a color layer (14) formed on the transparent conductive layer with red, green and blue pixels is arranged in a predetermined pattern. The color layer comprises pigments for coloring purpose and transparent conductive particles having a hydrophobic surface. The transparent conductive particles are included from 5% to 50% by volume of the color layer. The color layer may preferably have a specific resistivity of from $10^{-1}$ Ω·cm to $10^8$ Ω·cm. The transparent conductive particles comprise base transparent conductive particles having a hydrophobic compound bound on their surface by coupling or graft polymerization.

A typical process of the color filter production comprises the steps of:

(a) forming the transparent conductive layer of a predetermined pattern on the transparent substrate, (b) preparing a micelle colloid dispersion by dispersing a pigment and transparent conductive particles having hydrophobic surface in a medium containing a redox reactive surfactant and an electrolyte, and (c) carrying out an electrolysis in the micelle colloid dispersion by utilizing the transparent conductive layer on the transparent substrate for the anode to deposit the color layer comprising the pigment and the transparent conductive particles on the transparent conductive layer.

It will thus be seen that the objects set forth above, among those made apparent from the preceding description, are efficiently attained and, since certain changes may be made in carrying out the above method and in the article set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. A color filter for liquid crystal display device comprising an optically transparent substrate, a transparent conductive layer formed on the substrate, and a color layer formed on the transparent conductive layer with red, green and blue pixels arranged in a selected pattern, wherein said color layer includes at least pigments for coloring and transparent conductive particles having a hydrophobic surface, and said transparent conductive particles are included from 5% to 50% by volume of said color layer.

2. The color filter for liquid crystal display device according to claim 1 wherein said transparent conductive particles are included from 10% to 50% by volume of said color layer.

3. The color filter for liquid crystal display device according to claim 1 wherein said color layer has a specific resistivity of from $10^{-1}$ Ω·cm to $10^8$ Ω·cm.

4. The color filter for liquid crystal display device according to claim 3 wherein said color layer has a specific resistivity of from $10^{-1}$ Ω·cm to $10^7$ Ω·cm.

5. The color filter for liquid crystal display device according to claim 1 wherein said transparent conductive particles comprise base transparent conductive particles having a hydrophobic compound bound on their surface.

6. The color filter for liquid crystal display device according to claim 5 wherein said hydrophobic compound is at least one member selected from the group consisting of silane coupling agents, titanium coupling agents, aluminum coupling agents, zirconium coupling agents, and zircoaluminate agents.

7. The color filter for liquid crystal display device according to claim 6 wherein said silane coupling agent is at least one member selected from the group consisting of compounds represented by formula (1):

wherein

X is an alkoxy group, an acyloxy group, amino group or chlorine, $R^1$ and $R^2$ are independently an alkyl group, an alkenyl group, cyclohexyl group or phenyl group which optionally has a side chain or oxygen bridge, and (m+n) is from 0 to 4; and compounds represented by formula (1)':

wherein

R is an alkyl group,

Y is an organic group containing vinyl group, glycidyl group, methacryl group; amino group, mercapto group, isocyanate group, or azide group, or an organic group having a halogen atom selected from chlorine and fluorine on its terminal, and n is 2 or 3.

8. The color filter for liquid crystal display device according to claim 6 wherein said titanium coupling agent is at least one member selected from the group consisting of compounds represented by formula (2):

wherein

RO is a hydrolyzable alkoxy group; and

X is a long chain hydrophobic group containing carboxyl group, sulfonyl group or phosphate group.

9. The color filter for liquid crystal display device according to claim 5 wherein said hydrophobic compound comprises a graft polymerized hydrophobic monomer.

10. The color filter for liquid crystal display device according to claim 9 wherein said monomer is at least one member selected from an acrylamide derivative, an alkyl (meth)acrylate compound, an aromatic vinyl compound, a halogen-containing vinyl compound, and a cyanated vinyl compound.

11. The color filter for liquid crystal display device according to any one of claims 1 to 10 wherein said color layer has a thickness of from 0.4 μm to 2.0 μm.

12. The color filter for liquid crystal display device according to any one of claims 1 to 10 further comprising a transparent flattening layer formed on the color layer.

13. The color filter for liquid crystal display device according to claim 12 wherein said flattening layer has a thickness of from 0.1 μm to 1.0 μm.

14. A method for producing a color filter for liquid crystal display device (a) forming a transparent conductive layer of a predetermined pattern on a transparent substrate;

(b) preparing a micelle colloid dispersion by dispersing a pigment and transparent conductive particles having hydrophobic surface in a medium containing a redox reactive surfactant and an electrolyte; and (c) carrying out an electrolysis in said micelle colloid dispersion by utilizing the transparent conductive layer on the transparent substrate produced in the step (a) for the anode to deposit a color layer comprising said pigment and said transparent conductive particles on the transparent conductive layer.

15. The method for producing a color filter for liquid crystal display device according to claim 14 wherein said surfactant used in said step (b) is a ferrocene derivative.

16. The method for producing a color filter for liquid crystal display device according to claim 14 or 15 wherein said transparent conductive particles having the hydrophobic surface used in said step (b) are produced by a coupling treatment comprising the steps of;

introducing a functional group on base transparent conductive particles; and allowing a coupling agent to react with said base transparent conductive particles via said functional group.

17. The method for producing a color filter for liquid crystal display device according to claim 16 wherein said base transparent conductive particles have an average primary particle size of from 25 Å to 1,000 Å.

18. The method for producing a color filter for liquid crystal display device according to claim 14 or 15 wherein said transparent conductive particles having the hydrophobic surface used in said step (b) are produced by a graft polymerization treatment comprising the steps of;

introducing a functional group on base transparent conductive particles; and graft polymerizing a monomer having a hydrophobic organic group on its terminal onto said base transparent conductive particles via said functional group.

19. A method for producing a color filter for liquid crystal display device (a) forming a transparent conductive layer of a predetermined pattern on a transparent substrate, (b) preparing a dispersion includes at least a pigment, transparent conductive particles having hydrophobic surface and resin; and (c) coating said dispersion on said transparent conductive layer and curing said coating to form a color layer.

20. The method for producing a color filter for liquid crystal display device according to claim 19 wherein said transparent conductive particles having the hydrophobic surface used in said step (b) are produced by a coupling treatment comprising the steps of;

introducing a functional group on base transparent conductive particles; and allowing a coupling agent to react with said base transparent conductive particles via said functional group.

21. The method for producing a color filter for liquid crystal display device according to claim 19 wherein said transparent conductive particles having the hydrophobic surface used in said step (b) are produced by a graft polymerization treatment comprising the steps of;

introducing a functional group on base transparent conductive particles; and graft polymerizing a monomer having a hydrophobic organic group on its terminal onto said base transparent conductive particles via said functional group.

22. The method for producing a color filter for liquid crystal display device according to claim 20 or 21 wherein said base transparent conductive particles have an average primary particle size of from 25 Å to 1,000 Å.

* * * * *